(12) United States Patent
Patel et al.

(10) Patent No.: US 9,883,155 B2
(45) Date of Patent: Jan. 30, 2018

(54) METHODS AND SYSTEMS FOR COMBINING FOREGROUND VIDEO AND BACKGROUND VIDEO USING CHROMATIC MATCHING

(71) Applicant: Personify, Inc., Chicago, IL (US)

(72) Inventors: Sanjay Patel, Champaign, IL (US); Elad Yarkony, Urbana, IL (US)

(73) Assignee: PERSONIFY, INC., Chicago, IL (US)

( * ) Notice: Subject to any disclaimer, the term of this patent is extended or adjusted under 35 U.S.C. 154(b) by 0 days.

(21) Appl. No.: 15/181,653

(22) Filed: Jun. 14, 2016

(65) Prior Publication Data

US 2017/0359559 A1    Dec. 14, 2017

(51) Int. Cl.
| | | |
|---|---|---|
| *H04N 9/74* | (2006.01) | |
| *H04N 9/73* | (2006.01) | |
| *H04N 5/272* | (2006.01) | |
| *H04N 9/12* | (2006.01) | |

(52) U.S. Cl.
CPC ............. *H04N 9/73* (2013.01); *H04N 5/272* (2013.01); *H04N 9/12* (2013.01)

(58) Field of Classification Search
CPC ............ H04N 9/73; H04N 9/12; H04N 5/272; H04N 9/74; H04N 9/75; H04N 5/445
USPC .................... 348/584, 586, 587, 589, 582
See application file for complete search history.

(56) References Cited

U.S. PATENT DOCUMENTS

| | | | |
|---|---|---|---|
| 5,001,558 A | 3/1991 | Burley | |
| 5,022,085 A | 6/1991 | Cok | |
| 5,117,283 A | 5/1992 | Kroos | |
| 5,227,985 A | 7/1993 | DeMenthon | |
| 5,343,311 A | 8/1994 | Morag | |
| 5,506,946 A | 4/1996 | Bar | |
| 5,517,334 A | 5/1996 | Morag | |
| 5,534,917 A | 7/1996 | MacDougall | |
| 5,581,276 A | 12/1996 | Cipolla | |

(Continued)

FOREIGN PATENT DOCUMENTS

WO    2013019259    2/2013

OTHER PUBLICATIONS

Akbarzadeh, A., et al., "Towards Urban 3D Reconstruction From Video," Third International Symposium on 3D Data Processing, Visualization, and Transmission, pp. 1-8 (Jun. 14-16, 2006).

(Continued)

*Primary Examiner* — Trang U Tran
(74) *Attorney, Agent, or Firm* — Invention Mine LLC

(57) ABSTRACT

Disclosed herein are methods and systems for combining foreground video and background video using chromatic matching. In an embodiment, a system obtains foreground video data. The system obtains background video data. The system determines a color-distribution dimensionality of the background video data to be either high-dimensional chromatic or low-dimensional chromatic. The system selects a chromatic-adjustment technique from a set of chromatic-adjustment techniques based on the determined color-distribution dimensionality of the background video data. The system adjusts the foreground video data using the selected chromatic-adjustment technique. The system generates combined video data at least in part by combining the background video data with the adjusted foreground video data. The system outputs the combined video for display.

21 Claims, 17 Drawing Sheets

(56) References Cited

U.S. PATENT DOCUMENTS

| | | | |
|---|---|---|---|
| 5,631,697 A | 5/1997 | Nishimura | |
| 5,687,306 A | 11/1997 | Blank | |
| 5,875,040 A | 2/1999 | Matraszek | |
| 6,119,147 A | 9/2000 | Toomey | |
| 6,125,194 A | 9/2000 | Yeh | |
| 6,150,930 A | 11/2000 | Cooper | |
| 6,288,703 B1 * | 9/2001 | Berman | H04N 9/75 345/421 |
| 6,411,744 B1 | 6/2002 | Edwards | |
| 6,618,444 B1 | 9/2003 | Haskell | |
| 6,661,918 B1 | 12/2003 | Gordon | |
| 6,664,973 B1 | 12/2003 | Iwamoto | |
| 6,760,749 B1 | 7/2004 | Dunlap | |
| 6,798,407 B1 | 9/2004 | Benman | |
| 6,937,744 B1 | 8/2005 | Toyama | |
| 6,973,201 B1 | 12/2005 | Colmenarez | |
| 7,050,070 B2 | 5/2006 | Ida | |
| 7,124,164 B1 | 10/2006 | Chemtob | |
| 7,317,830 B1 | 1/2008 | Gordon | |
| 7,386,799 B1 | 6/2008 | Clanton | |
| 7,420,490 B2 | 9/2008 | Gupta | |
| 7,420,590 B2 | 9/2008 | Matusik | |
| 7,463,296 B2 | 12/2008 | Sun | |
| 7,512,262 B2 | 3/2009 | Criminisi | |
| 7,518,051 B2 | 4/2009 | Redmann | |
| 7,574,043 B2 | 8/2009 | Porikli | |
| 7,599,555 B2 | 10/2009 | McGuire | |
| 7,602,990 B2 | 10/2009 | Matusik | |
| 7,631,151 B2 | 12/2009 | Prahlad | |
| 7,633,511 B2 | 12/2009 | Shum | |
| 7,634,533 B2 | 12/2009 | Rudolph | |
| 7,668,371 B2 | 2/2010 | Dorai | |
| 7,676,081 B2 | 3/2010 | Blake | |
| 7,692,664 B2 | 4/2010 | Weiss | |
| 7,720,283 B2 | 5/2010 | Sun | |
| 7,742,650 B2 | 6/2010 | Ku | |
| 7,747,044 B2 | 6/2010 | Baker | |
| 7,755,016 B2 | 7/2010 | Toda | |
| 7,773,136 B2 | 8/2010 | Ohyama | |
| 7,821,552 B2 | 10/2010 | Suzuki | |
| 7,831,087 B2 | 11/2010 | Harville | |
| 7,912,246 B1 | 3/2011 | Moon | |
| 7,965,885 B2 | 6/2011 | Iwai | |
| 8,073,196 B2 | 12/2011 | Yuan | |
| 8,094,928 B2 | 1/2012 | Graepel | |
| 8,131,011 B2 | 3/2012 | Nevatia | |
| 8,146,005 B2 | 3/2012 | Jones | |
| 8,175,379 B2 | 5/2012 | Wang | |
| 8,175,384 B1 | 5/2012 | Wang | |
| 8,204,316 B2 | 6/2012 | Panahpour | |
| 8,225,208 B2 | 7/2012 | Sprang | |
| 8,238,605 B2 | 8/2012 | Chien | |
| 8,249,333 B2 | 8/2012 | Agarwal | |
| 8,264,544 B1 | 9/2012 | Chang | |
| 8,300,890 B1 | 10/2012 | Gaikwad | |
| 8,300,938 B2 | 10/2012 | Can | |
| 8,320,666 B2 | 11/2012 | Gong | |
| 8,331,619 B2 | 12/2012 | Ikenoue | |
| 8,331,685 B2 | 12/2012 | Pettigrew | |
| 8,335,379 B2 | 12/2012 | Malik | |
| 8,345,082 B2 | 1/2013 | Tysso | |
| 8,355,379 B2 | 1/2013 | Thomas | |
| 8,363,908 B2 | 1/2013 | Steinberg | |
| 8,379,101 B2 | 2/2013 | Mathe | |
| 8,411,149 B2 | 2/2013 | Maison | |
| 8,396,328 B2 | 3/2013 | Sandrew | |
| 8,406,494 B2 | 3/2013 | Zhan | |
| 8,411,948 B2 | 4/2013 | Rother | |
| 8,422,769 B2 | 4/2013 | Rother | |
| 8,437,570 B2 | 5/2013 | Criminisi | |
| 8,446,459 B2 | 5/2013 | Fang | |
| 8,446,488 B2 * | 5/2013 | Yim | H04N 9/643 348/223.1 |
| 8,477,149 B2 * | 7/2013 | Beato | G06K 9/4652 345/592 |
| 8,503,720 B2 | 8/2013 | Shotton | |
| 8,533,593 B2 | 9/2013 | Grossman | |
| 8,533,594 B2 | 9/2013 | Grossman | |
| 8,533,595 B2 | 9/2013 | Grossman | |
| 8,565,485 B2 | 10/2013 | Craig | |
| 8,588,515 B2 | 11/2013 | Bang | |
| 8,625,897 B2 | 1/2014 | Criminisi | |
| 8,643,701 B2 | 2/2014 | Nguyen | |
| 8,649,592 B2 | 2/2014 | Nguyen | |
| 8,649,932 B2 | 2/2014 | Mian | |
| 8,655,069 B2 | 2/2014 | Rother | |
| 8,659,658 B2 | 2/2014 | Vassigh | |
| 8,666,153 B2 | 3/2014 | Hung | |
| 8,682,072 B2 | 3/2014 | Sengamedu | |
| 8,701,002 B2 | 4/2014 | Grossman | |
| 8,723,914 B2 | 5/2014 | Mackie | |
| 8,818,028 B2 | 8/2014 | Nguyen | |
| 8,831,285 B2 | 9/2014 | Kang | |
| 8,854,412 B2 | 10/2014 | Tian | |
| 8,874,525 B2 | 10/2014 | Grossman | |
| 8,890,923 B2 | 11/2014 | Tian | |
| 8,890,929 B2 | 11/2014 | Paithankar | |
| 8,897,562 B2 | 11/2014 | Bai | |
| 8,913,847 B2 | 12/2014 | Tang | |
| 8,994,778 B2 | 3/2015 | Weiser | |
| 9,008,457 B2 | 4/2015 | Dikmen | |
| 9,053,573 B2 | 6/2015 | Lin | |
| 9,065,973 B2 | 6/2015 | Graham | |
| 9,084,928 B2 | 7/2015 | Klang | |
| 9,087,229 B2 | 7/2015 | Nguyen | |
| 9,088,692 B2 | 7/2015 | Carter | |
| 9,117,310 B2 | 8/2015 | Coene | |
| 9,269,153 B2 | 2/2016 | Gandolph | |
| 9,285,951 B2 | 3/2016 | Makofsky | |
| 9,336,610 B2 | 5/2016 | Ohashi | |
| 9,542,626 B2 | 1/2017 | Martinson | |
| 2002/0012072 A1 * | 1/2002 | Toyama | H04N 9/75 348/586 |
| 2002/0025066 A1 * | 2/2002 | Pettigrew | G06T 11/001 382/162 |
| 2002/0051491 A1 | 5/2002 | Challapali | |
| 2002/0158873 A1 | 10/2002 | Williamson | |
| 2004/0004626 A1 | 1/2004 | Ida | |
| 2004/0153671 A1 | 8/2004 | Schuyler | |
| 2004/0175021 A1 | 9/2004 | Porter | |
| 2005/0063565 A1 | 3/2005 | Nagaoka | |
| 2005/0094879 A1 | 5/2005 | Harville | |
| 2005/0219264 A1 | 10/2005 | Shum | |
| 2005/0219391 A1 | 10/2005 | Sun | |
| 2005/0262201 A1 | 11/2005 | Rudolph | |
| 2006/0072022 A1 | 4/2006 | Iwai | |
| 2006/0193509 A1 | 8/2006 | Criminisi | |
| 2006/0221248 A1 | 10/2006 | McGuire | |
| 2006/0259552 A1 | 11/2006 | Mock | |
| 2006/0291697 A1 | 12/2006 | Luo | |
| 2007/0036432 A1 | 2/2007 | Xu | |
| 2007/0070200 A1 | 3/2007 | Matusik | |
| 2007/0110298 A1 | 5/2007 | Graepel | |
| 2007/0133880 A1 | 6/2007 | Sun | |
| 2007/0146512 A1 | 6/2007 | Suzuki | |
| 2007/0201738 A1 | 8/2007 | Toda | |
| 2007/0269108 A1 | 11/2007 | Steinberg | |
| 2008/0109724 A1 | 5/2008 | Gallmeier | |
| 2008/0181507 A1 | 7/2008 | Gope | |
| 2008/0219554 A1 | 9/2008 | Dorai | |
| 2008/0266380 A1 | 10/2008 | Gorzynski | |
| 2008/0273751 A1 | 11/2008 | Yuan | |
| 2009/0003687 A1 | 1/2009 | Agarwal | |
| 2009/0044113 A1 | 2/2009 | Jones | |
| 2009/0110299 A1 | 4/2009 | Panahpour | |
| 2009/0144651 A1 | 6/2009 | Sprang | |
| 2009/0199111 A1 | 8/2009 | Emori | |
| 2009/0244309 A1 | 10/2009 | Maison | |
| 2009/0245571 A1 | 10/2009 | Chien | |
| 2009/0249863 A1 | 10/2009 | Kim | |
| 2009/0278859 A1 | 11/2009 | Weiss | |
| 2009/0284627 A1 | 11/2009 | Bando | |
| 2009/0290795 A1 | 11/2009 | Criminisi | |
| 2009/0300553 A1 | 12/2009 | Pettigrew | |

(56) References Cited

U.S. PATENT DOCUMENTS

| | | |
|---|---|---|
| 2010/0027961 A1 | 2/2010 | Gentile |
| 2010/0034457 A1 | 2/2010 | Berliner |
| 2010/0046830 A1 | 2/2010 | Wang |
| 2010/0053212 A1 | 3/2010 | Kang |
| 2010/0128927 A1 | 5/2010 | Ikenoue |
| 2010/0166325 A1 | 7/2010 | Sengamedu |
| 2010/0171807 A1 | 7/2010 | Tysso |
| 2010/0195898 A1 | 8/2010 | Bang |
| 2010/0278384 A1 | 11/2010 | Shotton |
| 2010/0302376 A1 | 12/2010 | Boulanger |
| 2010/0302395 A1 | 12/2010 | Mathe |
| 2010/0329544 A1 | 12/2010 | Sabe |
| 2011/0038536 A1 | 2/2011 | Gong |
| 2011/0090311 A1 | 4/2011 | Fang |
| 2011/0115886 A1 | 5/2011 | Nguyen |
| 2011/0158529 A1 | 6/2011 | Malik |
| 2011/0193939 A1 | 8/2011 | Vassigh |
| 2011/0216965 A1 | 9/2011 | Rother |
| 2011/0216975 A1 | 9/2011 | Rother |
| 2011/0216976 A1 | 9/2011 | Rother |
| 2011/0242277 A1 | 10/2011 | Do |
| 2011/0243430 A1 | 10/2011 | Hung |
| 2011/0249190 A1 | 10/2011 | Nguyen |
| 2011/0249863 A1 | 10/2011 | Ohashi |
| 2011/0249883 A1 | 10/2011 | Can |
| 2011/0267348 A1 | 11/2011 | Lin |
| 2011/0293179 A1 | 12/2011 | Dikmen |
| 2011/0293180 A1 | 12/2011 | Criminisi |
| 2012/0051631 A1 | 3/2012 | Nguyen |
| 2012/0127259 A1 | 5/2012 | Mackie |
| 2012/0314077 A1 | 12/2012 | Clavenna, II |
| 2013/0016097 A1 | 1/2013 | Coene |
| 2013/0028476 A1 | 1/2013 | Craig |
| 2013/0094780 A1 | 4/2013 | Tang |
| 2013/0110565 A1 | 5/2013 | Means |
| 2013/0129205 A1 | 5/2013 | Wang |
| 2013/0142452 A1 | 6/2013 | Shionozaki |
| 2013/0147900 A1 | 6/2013 | Weiser |
| 2013/0243313 A1 | 9/2013 | Civit |
| 2013/0335506 A1 | 12/2013 | Carter |
| 2014/0003719 A1 | 1/2014 | Bai |
| 2014/0029788 A1 | 1/2014 | Kang |
| 2014/0063177 A1 | 3/2014 | Tian |
| 2014/0085398 A1 | 3/2014 | Tian |
| 2014/0112547 A1 | 4/2014 | Peeper |
| 2014/0119642 A1 | 5/2014 | Lee |
| 2014/0153784 A1 | 6/2014 | Gandolph |
| 2014/0229850 A1 | 8/2014 | Makofsky |
| 2014/0300630 A1 | 10/2014 | Flider |
| 2014/0307056 A1 | 10/2014 | Romea |
| 2017/0208243 A1 | 7/2017 | Masad |

OTHER PUBLICATIONS

Arbelaez, P., et ,al., "Contour detection and hierarchical image segmentation", Pattern Analysis and Machine Intelligence, IEEE Transactions on 33.4 (2011): 898-916.

Barnat, Jii'f, et al., "CUDA accelerated LTL Model Checking," FI MU Report Series, FIMU-RS-2009-05, 20 pages (Jun. 2009).

Benezeth et al., "Review and Evaluation of Commonly-Implemented Background Subtraction Algorithms", 2008.

Canesta™, "See How Canesta's Solution Gesture Control Will Change the Living Room," retrieved Oct. 21, 2010, from http://canesta.com, 2 pages.

Carsten, R., et al., "Grabcut: Interactive foreground extraction using iterated graph cuts", ACM Transactions on Graphics (TOG) 23.3 (2004), pp. 309-314.

Chan, S.C., et al., "Image-Based Rendering and Synthesis," IEEE Signal Processing Magazine, pp. 22-31 (Nov. 2007).

Chan, Shing-Chow, et al. "The Plenoptic Video," 15(12) IEEE Transactions on Circuits and Systems for Video Technology 1650-1659 (Dec. 2005).

Chen, Wan-Yu, et al., "Efficient Depth Image Based Rendering with Edge Dependent Depth Filter and Interpolation," IEEE International Conference on Multimedia and Expo, pp. 1314-1317 (Jul. 6, 2005).

Cheung et al., "Robust Techniques for Background Subtraction in Urban Traffice Video", 2004.

Crabb et al., "Real-Time Foreground Segmentation via Range and Color Imaging", 2008.

Debevec, Paul, et al., "Efficient View-Dependent Image-Based Rendering with Projective Texture-Mapping," In 9th Eurographics Workshop on Rendering, pp. 105-116 (Jun. 1998).

Fehn, Christoph, et al., "Interactive 3-DTV-Concepts and Key Technologies," 94(3) Proceedings of the IEEE 524-538 (Mar. 2006).

GPGPU (General-purpose computing on graphics processing units)—Wikipedia, retrieved Nov. 17, 2009, from http://en.wikipedia.org/wiki/GPGPU, 9 pages.

Gvili et al., "Depth Keying", 2003.

Ho, Yo-Sung, et al., "Three-dimensional Video Generation for Realistic Broadcasting Services," ITC-CSCC, pp. Tr4 through TR4 (2008).

Jung, Kwang Hee, et al., "Depth Image Based Rendering for 3D Data Service Over T-DMB," IEEE, 3DTV-CON'08, Istanbul, Turkey, pp. 237-240 (May 28-30, 2008).

Kanade, Takeo, et al., "Virtualized Reality: Constructing Virtual Worlds from Real Scenes," IEEE MultiMedia, pp. 34-46 (Jan.-Mar. 1997).

Kao, Wen-Chung, et al., "Multistage Bilateral Noise Filtering and Edge Detection for Color Image Enhancement," 51 (4) IEEE Transactions on Consumer Electronics 1346-1351 (Nov. 2005).

Kipfer, Peter, "GPU Gems 3—Chapter 33. LCP Algorithms for Collision Detection Using CUDA," retrieved Nov. 17, 2009, from http://http.developer.nvidia.com/ GPUGems3/qpuqems3 ch33.html, 11 pages (2007).

Kitagawa et al., "Background Separation Encoding for Surveillance Purpose by using Stable Foreground Separation", APSIPA, Oct. 4-7, 2009, pp. 849-852.

Kolmogorov, et al., "Bi-Layer Segmentation of Binocular Stereo Vision", IEEE, 2005.

Kubota, Akira, et al., "Multiview Imaging and 3DTV," IEEE Signal Processing Magazine, pp. 10-21 (Nov. 2007).

Lee, D.S., "Effective Gaussian Mixture for Video Background Subtraction", IEEE, vol. 27, No. 5, dated May 2005, pp. 827-832.

Lee, Eun-Kyung, et al., "High-Resolution Depth Map Generation by Applying Stereo Matching Based on Initial Depth Information," 3DTV-CON'08, Istanbul, Turkey, pp. 201-204 (May 28-30, 2008).

Izquierdo' M. Ebroul. "Disparity/segmentation analysis: matching with an adaptive window and depth-driven segmentation." Circuits and Systems for Video Technology, IEEE Transactions on 9.4 (1999): 589-607.

Mark, William R., et al., "Post-Rendering 3D Warping," In Proceedings of 1997 Symposium on Interactive 3D Graphics, Providence, RI, pp. 7-16 (Apr. 27-30, 1997).

McMillan, Jr., Leonard, "An Image-Based Approach to Three-Dimensional Computer Graphics," University of North Carolina at Chapel Hill, Chapel Hill, NC, 206 pages (1997).

Nguyen, Ha T., et al., "Image-Based Rendering with Depth Information Using the Propagation Algorithm," Proc. of IEEE International Conference on Acoustics, Speech, and Signal Processing (ICASSP), 4 pages (Mar. 2005).

Nguyen, Quang H., et al., "Depth image-based rendering from multiple cameras with 3D propagation algorithm," Proceedings of the 2nd International Conference on Immersive Telecommunications, 6 pages (2009).

Nguyen, Quang H., et al., "Depth Image-Based Rendering with Low Resolution Depth," 16th IEEE International Conference on Image Processing (ICIP), pp. 553-556 (2009).

Piccardi, M., "Background Subtraction Techniques: A Review", IEEE, 2004.

PrimeSense, Home Page, retrieved Oct. 21, 2010, from http://www.primesense.com, 1 page.

Saxena, Ashutosh, et al., "3-D Depth Reconstruction from a Single Still Image," 76(1) International Journal of Computer Vision 53-69 (2007).

(56) References Cited

OTHER PUBLICATIONS

Shade, Jonathan, et al., "Layered Depth Images," Computer Graphics Proceedings, Annual Conference Series, pp. 231-242 (Jul. 19-24, 1998).

Tomasi, C., et al., "Bilateral Filtering for Gray and Color Images," Sixth International Conference on Computer Vision, pp. 839-846 (1998).

Vazquez, C., et al., "3D-TV: Coding of Disocclusions for 2D+Depth Representation of Multi-View Images," Proceedings of the Tenth IASTED Int'l Conference: Computer Graphics and Imaging, pp. 26-33 (Feb. 13-15, 2008).

Wang, L., et al., "Tofcut: Towards robust real-time foreground extraction using a time-off camera.", Proc. of 3DPVT, 2010.

Xu, F., et al., "Human detection using depth and gray images", Advanced Video and Signal Based Surveillance, 2003., Proceedings, IEEE Conference on IEEE, 2003.

Yang, Qingxiong, et al., "Spatial-Depth Super Resolution for Range Images," IEEE Conference on Computer Vision and Pattern Recognition, pp. 1-8 (2007).

Zhang, Buyue, et al., "Adaptive Bilateral Filter for Sharpness Enhancement and Noise Removal," IEEE ICIP, pp. IV-417-IV-420 (2007).

Zhang, Q., et al., "Segmentation and tracking multiple objects under occlusion from multiview video.", Image Processing, IEEE Transactions on 20.11 (2011), pp. 3308-3313.

H. Y. Shum and S. B. Kang, "A Review of Image-based Rendering Techniques," Proc. IEEE/SPIE Visual Communications and Image (VCIP) 2000, pp. 2-13, Perth, Jun. 2000.

Um, Gi-Mun, et al., "Three-dimensional Scene Reconstruction Using Multi-View Images and Depth Camera", pp. 271-280, SPIE-IS&t, vol. 5664, 2005.

Zitnick, C. Lawrence, et al., "High-quality video view interpolation using a layered representation," 23(3) Journal ACM Transactions on Graphics (TOG)—Proceedings of ACM SIGGRAPH 2004, pp. 600-608 (Aug. 2004).

Yacoob, Y., et al., "Detection, analysis and matching of hair," in Computer Vision, 2005, ICCV 2005. Tenth IEEE International Conference, vol. 1., No., pp. 741-748, vol. 1, Oct. 17-21, 2005.

Talukder, A., et al., "Real-time detection of moving objects in a dynamic scene from moving robotic vehicles," in Intelligent Robots and Systems, 2003. (IROS 2003). Proceedings. 2003 IEEE/RSJ international Conference on, vol. 2, pp. 1308-1313, vol. 2, Oct. 27-31, 2003.

Sheasby, G., et al., "A robust stereo prior for human segmentation", In ACCV, 2012.

Hradis, M., et al., "Real-time Tracking of Participants in Meeting Video", Proceedings of CESCG, Wien, 2006.

Working screenshot of Snagit manufactured by Techsmith, released Apr. 18, 2014.

\* cited by examiner

L-TO-{A,B} LOOKUP TABLE
FROM IDEALIZED CHROMATICALLY
LOW-DIMENSIONAL BACKGROUND-
PIXEL SET IN {L,a,b}

900

| L | a | b |
|---|---|---|
| 0 | $a_0 = 46$ | $b_0 = 30$ |
| 1 | $a_1 = 51$ | $b_1 = 29$ |
| 2 | $a_2 = 44$ | $b_2 = 33$ |
| .... | .... | .... |
| 49 | $a_{49} = 50$ | $b_{49} = 33$ |
| 50 | $a_{50} = 48$ | $b_{50} = 32$ |
| 51 | $a_{51} = 47$ | $b_{51} = 33$ |
| .... | .... | .... |
| 99 | $a_{99} = 44$ | $b_{99} = 28$ |
| 100 | $a_{100} = 45$ | $b_{100} = 31$ |

Point 702 ▶ (row L=50)

FIG. 9

ORIGINAL FOREGROUND PIXELS IN {R,G,B}

1000

| PIXEL INDEX # | R | G | B |
|---|---|---|---|
| FG-0 | 247 | 26 | 153 |
| FG-1 | 127 | 89 | 5 |
| FG-2 | 181 | 95 | 66 |
| :::: | :::: | :::: | :::: |
| FG-155999 | 128 | 95 | 128 |
| FG-156000 | 230 | 24 | 102 |
| FG-156001 | 126 | 58 | 255 |
| :::: | :::: | :::: | :::: |
| FG-307199 | 153 | 110 | 70 |
| FG-307200 | 198 | 255 | 27 |

1002 → (FG-2 row)
1004 ▸ (FG-156000 row)
1006 → (FG-307199 row)

FIG. 10

ORIGINAL FOREGROUND PIXELS IN {L,a,b}

1100

| PIXEL INDEX # | L | a | b |
|---|---|---|---|
| FG-0 | 55 | 83 | -11 |
| FG-1 | 41 | 9 | 47 |
| FG-2 | 50 | 32 | 32 |
| :::: | :::: | :::: | :::: |
| FG-155999 | 45 | 19 | -13 |
| FG-156000 | 50 | 75 | 12 |
| FG-156001 | 45 | 70 | -86 |
| :::: | :::: | :::: | :::: |
| FG-307199 | 50 | 12 | 29 |
| FG-307200 | 93 | -44 | 87 |

1102 → (row FG-2)
1104 → (row FG-156000)
1106 → (row FG-307199)

FIG. 11

TRANSFORMED FOREGROUND PIXELS IN {L,a,b}

1400

| PIXEL INDEX # | L | a | b |
|---|---|---|---|
| FG-0 | 55 | $a_{55}$ | $b_{55}$ |
| FG-1 | 41 | $a_{41}$ | $b_{41}$ |
| FG-2 | 50 | $a_{50}$ (48) | $b_{50}$ (32) |
| :::: | :::: | :::: | :::: |
| FG-155999 | 45 | $a_{45}$ | $b_{45}$ |
| FG-156000 | 50 | $a_{50}$ (48) | $b_{50}$ (32) |
| FG-156001 | 45 | $a_{45}$ | $b_{45}$ |
| :::: | :::: | :::: | :::: |
| FG-307199 | 50 | $a_{50}$ (48) | $b_{50}$ (32) |
| FG-307200 | 93 | $a_{93}$ | $b_{93}$ |

TRANSFORMED FOREGROUND PIXELS FOLLOWING CONVERSION TO {R,G,B}

METHODS AND SYSTEMS FOR COMBINING FOREGROUND VIDEO AND BACKGROUND VIDEO USING CHROMATIC MATCHING

BACKGROUND

The combination of multiple images, e.g., a foreground image and a background image, into composite images is an important task in various different commercial industries and other contexts. If two images, which could be partial or complete frames of video data, are combined inartfully, the result may be a visually unpleasant and artificial-looking composition.

BRIEF DESCRIPTION OF THE DRAWINGS

FIG. 9 depicts an example L-to-{a,b} look-up table that corresponds to the example idealization of FIG. 8, in accordance with some embodiments.

FIG. 10 depicts an example table representation of example foreground video data in the {R,G,B} color space, in accordance with some embodiments.

FIG. 11 depicts an example table representation of the example foreground video data of FIG. 10 after having been converted to the {L,a,b} color space, in accordance with some embodiments.

FIG. 14 depicts an example table representation of the example converted foreground video data of FIGS. 11-12 after having been transformed in the {L,a,b} color space using a chromatic-replacement technique, in accordance with some embodiments.

DETAILED DESCRIPTION

Figure 1:
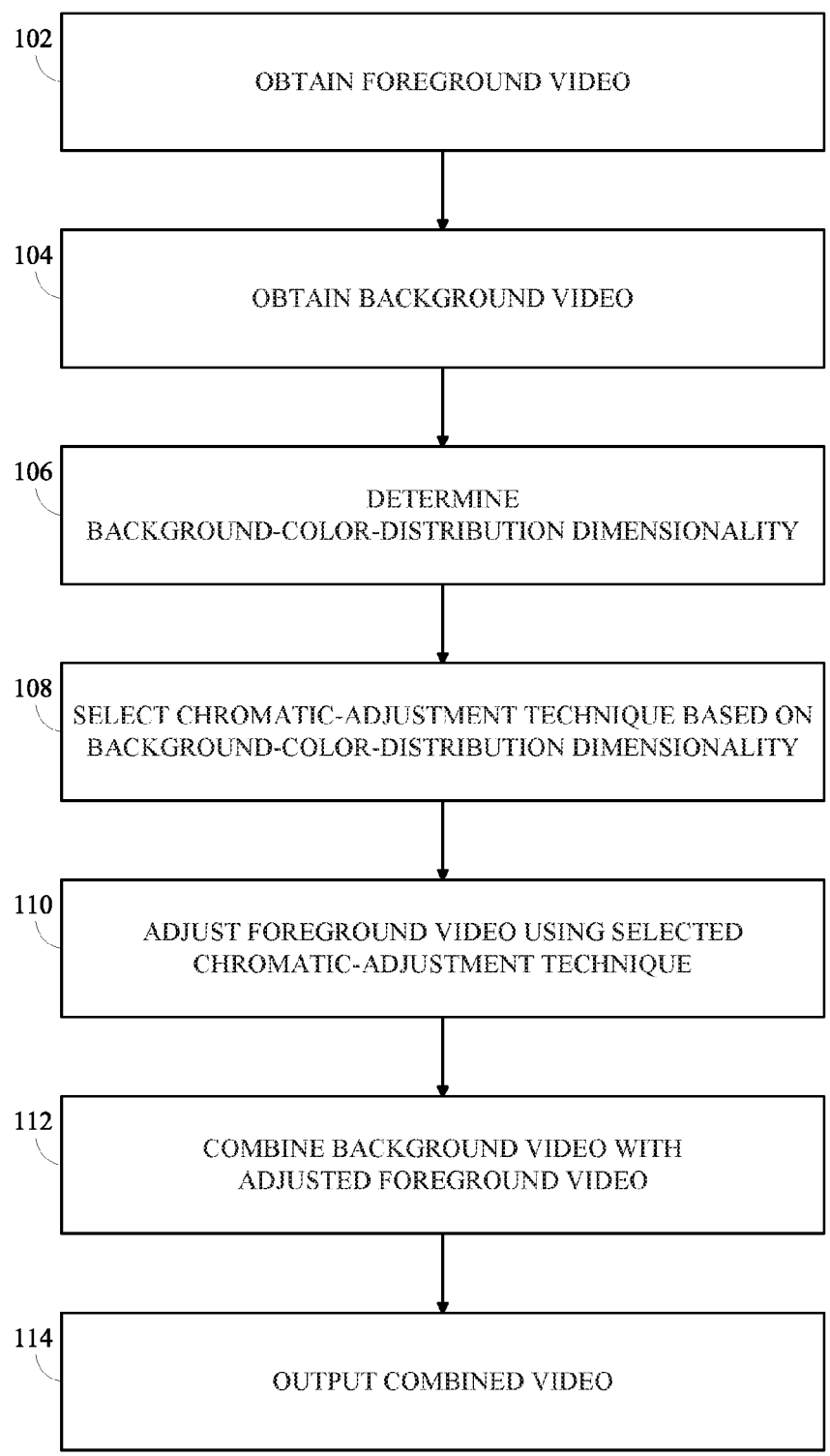
FIG. 1 depicts an example method, in accordance with some embodiments.

One embodiment takes the form of a method that includes (i) obtaining foreground video data; (ii) obtaining background video data; (iii) determining a color-distribution dimensionality of the background video data to be either high-dimensional chromatic or low-dimensional chromatic; (iv) selecting a chromatic-adjustment technique from a set of chromatic-adjustment techniques based on the determined color-distribution dimensionality of the background video data; (v) adjusting the foreground video data using the selected chromatic-adjustment technique; (vi) generating combined video data at least in part by combining the background video data with the adjusted foreground video data; and (vii) outputting the combined video data for display.

Another embodiment takes the form of a system that includes a communication interface, a processor, and a non-transitory computer-readable medium storing instructions executable by the processor for causing the system to perform at least the functions listed in the preceding paragraph.

Moreover, any of the variations and permutations described herein can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, determining the color-distribution dimensionality of the background video data to be either high-dimensional chromatic or low-dimensional chromatic includes (i) converting pixels of the background video data from an {R,G,B} color space to an {L,a,b} color space; (ii) calculating an {a,b} variance of the converted background pixels; (iii) comparing the calculated {a,b} variance to an {a,b}-variance threshold; (iv) determining the color-distribution dimensionality of the background video data to be high-dimensional chromatic if the calculated {a,b} variance exceeds the {a,b}-variance threshold; and (v) determining the color-distribution dimensionality of the background video data to be low-dimensional chromatic if the calculated {a,b} variance does not exceed the {a,b}-variance threshold.

In at least one embodiment, calculating the {a,b} variance of the converted background pixels includes determining how many luminance levels in the converted background pixels have more than a luminance-level-specific degree of {a,b} variance. In at least one such embodiment, the {a,b}-variance threshold is a threshold number of luminance levels; in at least one such embodiment, the threshold number of luminance levels is zero; in at least one other such embodiment, the threshold number of luminance levels is greater than zero.

In at least one embodiment, calculating the {a,b} variance of the converted background pixels includes (i) determining a respective luminance-level-specific {a,b} variance for each of a plurality of luminance levels that are represented in the converted background pixels and (ii) calculating the {a,b} variance of the converted background pixels to be a sum of the determined luminance-level-specific {a,b} variances.

In at least one embodiment, calculating the {a,b} variance of the converted background pixels includes (i) determining a respective luminance-level-specific {a,b} variance for each luminance level represented in the converted background pixels and (ii) calculating the {a,b} variance of the converted background pixels to be a sum of the determined luminance-level-specific {a,b} variances.

In at least one embodiment, determining the color-distribution dimensionality of the background video data to be either high-dimensional chromatic or low-dimensional chromatic includes (i) determining the color-distribution dimensionality of the background video data to be low-dimensional chromatic if a background-color distribution of the background video data in an {L,a,b} color space is supported by a relationship defined by:

$$\{(L,a,b) | a=f_a(L), b=f_b(L)\} \quad \text{(Eq. 1)}$$

where $f_a$ and $f_b$ are functions and (ii) otherwise determining the color-distribution dimensionality of the background video data to be high-dimensional chromatic.

In at least one embodiment: (i) the set of chromatic-adjustment techniques includes a white-balancing technique and a chromatic-replacement technique and (ii) selecting a chromatic-adjustment technique based on the determined color-distribution dimensionality includes (a) selecting the white-balancing technique when the color-distribution dimensionality of the background video data is determined to be high-dimensional chromatic and (b) selecting the chromatic-replacement technique when the color-distribution dimensionality of the background video data is determined to be low-dimensional chromatic.

In at least one embodiment, adjusting the foreground video data using the white-balancing technique includes (i) determining a foreground average of pixels of the foreground video data in an {R,G,B} color space; (ii) determining a background average of pixels of the background video data in the {R,G,B} color space; (iii) converting the foreground average and the background average from the {R,G,B} color space to a second color space; (iv) determining a transform matrix in the second color space from the converted foreground average to the converted background average; (v) converting the pixels of the foreground video data from the {R,G,B} color space to the second color space; (vi) transforming the converted foreground pixels in the second color space using the determined transform matrix; and (vii) converting the transformed foreground pixels from the second color space to the {R,G,B} color space.

In at least one embodiment, the determined transform matrix includes dimension-wise ratios in the second color space of the converted background average to the converted foreground average. In at least one embodiment, the second color space is an {L,a,b} color space. In at least one embodiment, the second color space is an {X,Y,Z} color space. In at least one such embodiment, converting the foreground pixels from the {R,G,B} color space to the second color space includes converting the foreground pixels from the {R,G,B} color space to an {L,a,b} color space and then from the {L,a,b} color space to the {X,Y,Z} color space.

In at least one embodiment, the method also includes converting pixels of the background video data from an {R,G,B} color space to an {L,a,b} color space, and adjusting the foreground video data using the chromatic-replacement technique includes: (i) generating an L-to-{a,b} lookup table based on the converted background pixels; (ii) converting pixels of the foreground video data from the {R,G,B} color space to the {L,a,b} color space; (iii) transforming the converted foreground pixels at least in part by (a) using the respective L values of the respective converted foreground pixels to select respective replacement {a,b} values for the respective converted foreground pixels based on the L-to-{a,b} lookup table and (b) replacing the respective {a,b} values of the respective converted foreground pixels with the corresponding respective selected replacement {a,b} values; and (iv) converting the transformed foreground pixels from the {L,a,b} color space to the {R,G,B} color space.

In at least one embodiment, using the respective L values of the respective converted foreground pixels to select the respective replacement {a,b} values for the respective converted foreground pixels based on the L-to-{a,b} lookup table includes retrieving the respective replacement {a,b} values from the L-to-{a,b} lookup table in cases where the respective L value of the respective converted foreground pixel is listed in the L-to-{a,b} lookup table.

In at least one embodiment, using the respective L values of the respective converted foreground pixels to select the respective replacement {a,b} values for the respective converted foreground pixels based on the L-to-{a,b} lookup table further includes using interpolated {a,b} values based on one or more entries in the L-to-{a,b} lookup table as the respective replacement {a,b} values in cases where the respective L value of the respective converted foreground pixel is not listed in the L-to-{a,b} lookup table. In at least one such embodiment, the interpolated {a,b} values are copied from a nearest L value that is listed in the L-to-{a,b} lookup table; in at least one other such embodiment, the interpolated {a,b} values are average {a,b} values of two or more proximate entries in the L-to-{a,b} lookup table.

In at least one embodiment, the method also includes (i) obtaining second foreground video data and (ii) adjusting the second foreground video data using the selected chromatic-adjustment technique, and generating the combined video data includes combining the background video data with both the adjusted foreground video data and the adjusted second foreground video data.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseam in this detailed description.

FIG. 1 depicts an example method, in accordance with some embodiments.

In particular, FIG. 1 depicts a method 100 that is described below by way of example as being carried out by the example computing device (or system) 200 that is described in connection with FIG. 2. In general, the method 100 could be carried out by any computing device that is suitably equipped, programmed, and configured. The method 100 includes steps 102-114, which are described briefly in connection with FIG. 1 and more fully in connection with the ensuing figures.

At step 102, the computing device 200 obtains foreground video data. At step 104, the computing device 200 obtains background video data. At step 106, the computing device determines a color-distribution dimensionality of the background video data to be either high-dimensional chromatic or low-dimensional chromatic. At step 108, the computing device 200 selects a chromatic-adjustment technique from a set of chromatic-adjustment techniques based on the determined color-distribution dimensionality of the background video data. At step 110, the computing device 200 adjusts the foreground video data using the selected chromatic-adjustment technique. At step 112, the computing device 200 generates combined video data at least in part by combining the background video data with the adjusted foreground video data. At step 114, the computing device 200 outputs the combined video data for display.

Figure 2:
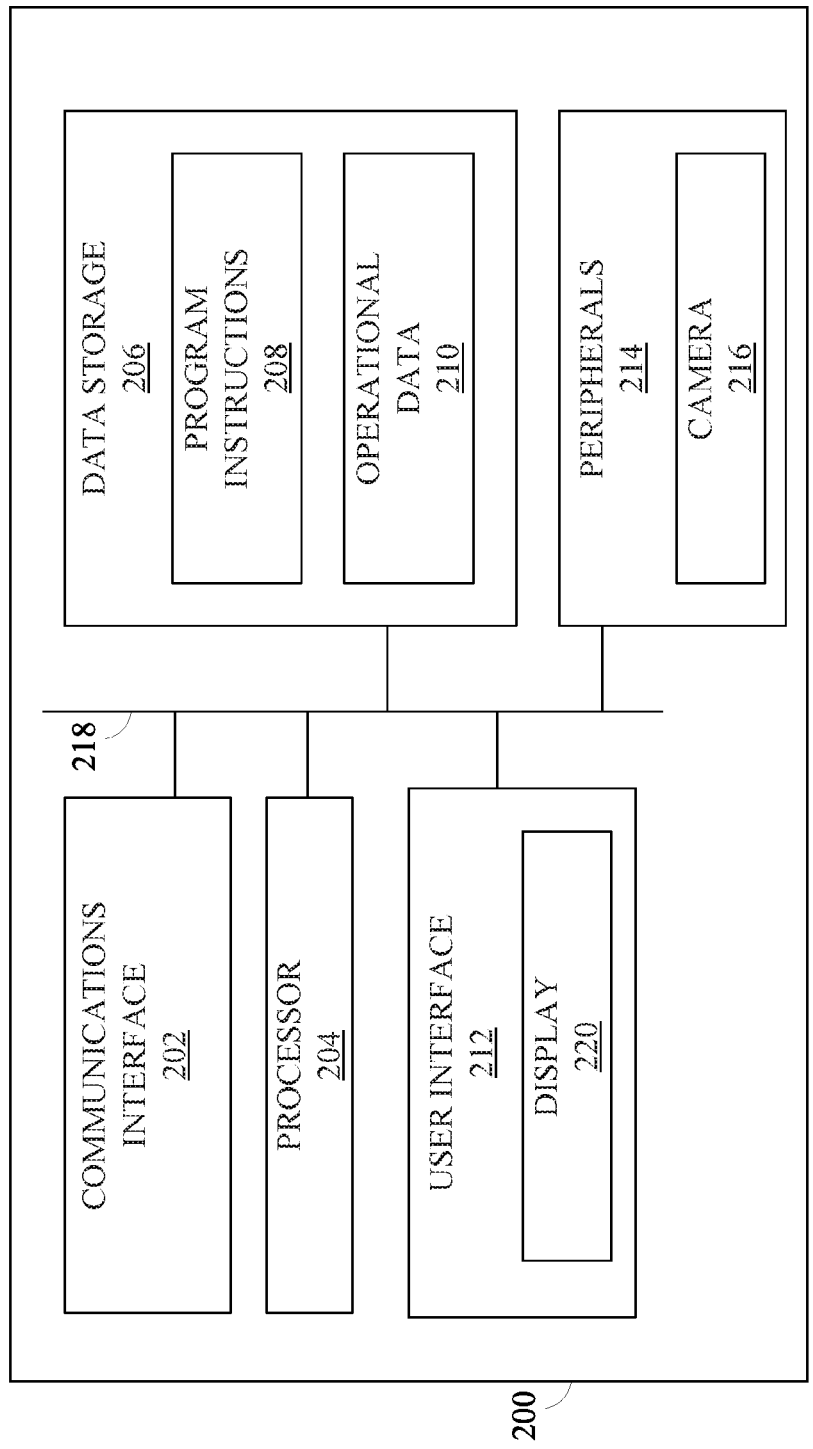
FIG. 2 depicts an architectural view of an example computing device, in accordance with some embodiments.

FIG. 2 depicts an architectural view of an example computing device, in accordance with some embodiments. The example computing device 200 may be configured to carry out the functions described herein, and as depicted includes a communications interface 202, a processor 204, data storage 206 (that contains program instructions 208 and operational data 210), a user interface 212 (that contains a display 220), peripherals 214 (that contains a camera 216), and a communication bus 218. This arrangement is presented by way of example and not limitation, as other example arrangements could be described here.

The communication interface 202 may be configured to be operable for communication according to one or more wireless-communication protocols, some examples of which include Long-Term Evolution (LTE), IEEE 802.11 (Wi-Fi), Bluetooth, and the like. The communication interface 202 may also or instead be configured to be operable for communication according to one or more wired-communication protocols, some examples of which include Ethernet and USB.) The communication interface 202 may include any necessary hardware (e.g., chipsets, antennas, Ethernet interfaces, etc.), any necessary firmware, and any necessary software for conducting one or more forms of communication with one or more other entities as described herein.

The processor 204 may include one or more processors of any type deemed suitable by those of skill in the relevant art, some examples including a general-purpose microprocessor and a dedicated digital signal processor (DSP).

The data storage 206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, the data storage 206 contains program instructions 208 executable by the processor 204 for carrying out various functions described herein, and further is depicted as containing operational data 210, which may include any one or more data values stored by and/or accessed by the computing device 200 in carrying out one or more of the functions described herein.

The user interface 212 may include one or more input devices (a.k.a. components and the like) and/or one or more output devices (a.k.a. components and the like.) With respect to input devices, the user interface 212 may include one or more touchscreens, buttons, switches, microphones, and the like. With respect to output devices, the user interface 212 may include one or more speakers, light emitting diodes (LEDs), and the like. In some embodiments, including the one depicted by way of example in FIG. 2, the user interface 212 includes a display 220. Moreover, one or more components (e.g., the display 220 could be an interactive touchscreen and display) of the user interface 212 could provide both user-input and user-output functionality. In some cases, such as in the case of the computing device 200 being a networked server, all or part of the user interface 212 may be virtually provided by the computing device 200 over a network connection; in other embodiments, the computing device 200 provides some or all of the user interface 212 via one or more connected devices such as keyboards, mice, touchpads, monitors, and/or the like. And certainly other configurations could be described here as well.

The peripherals 214 may include any computing device accessory, component, or the like, that is accessible to and useable by the computing device 200 during operation. In some embodiments, including the one depicted by way of example in FIG. 2, the peripherals 214 includes a camera 216 for, perhaps among other functions, capturing video data. The camera 216 could be an optical camera, and may also have depth-camera functionality. The camera 216 could be arranged to captured still images in addition to video. And certainly other example peripherals could be listed.

Returning to FIG. 1, at step 102, the computing device 200 obtains foreground video data. This step may be performed in several different ways. In at least one embodiment, the computing system 200 obtains foreground video data by capturing the foreground video data using the camera 216. In at least one embodiment, the computing device 200 obtains foreground video data by receiving the foreground video data via a network connection using the communication interface 202. And certainly other examples of ways in which the computing system 200 could obtain foreground video data at step 102 could be listed here.

At step 104, the computing device 200 obtains background video data, which the computing device 200 may do in any of the ways described above in connection with the computing device 200 obtaining the foreground video at step 102, or in any other manner deemed suitable in a given context by one of skill in the art.

Thus, in an example scenario, a user is using the computing device 200, which in this example is a laptop computer. The computing device 200 carries out step 102 by capturing video of the user, and then extracts from that captured video a persona of the user. In this example, then, the "foreground video" is the extracted persona. For an example procedure for persona extraction from a video feed, see U.S. Pat. No. 8,818,028, which issued Aug. 26, 2014 and is entitled "Systems and Methods for Accurate User Foreground Video Extraction," the entire contents of which are hereby incorporated herein by reference.

Further to this example scenario, the computing device 200 carries out step 104 by receiving a video feed via a network connection. In this example, then, the "background video" is that received video feed, which could be a slide-based presentation, as one example. Further to this example scenario, at the time they are obtained by the computing device 200, both the foreground video and the background video are in the form of frames of pixels; furthermore, at the time these frames are obtained, those pixels are expressed in what is known as the {R,G,B} color space.

As is known in the art, a pixel is an independently changeable and addressable display-data element that has properties such as color and location (e.g., Cartesian coordinates in a rectangular image). Generally speaking, higher-resolution images include greater number of pixels, and thus the potential for a higher amount of detail, then do lower-resolution images. As is further known in the art, pixels can contain color information in any of a variety of different color spaces. Some examples that are discussed herein include the {R,G,B} color space, the {L,a,b} color space, and the {X,Y,Z} color space, though certainly many others could be listed here and discussed herein, as those three are listed here and discussed herein by way of example. These three example color spaces are briefly discussed below though, as stated, they are known to those of skill in the art, as are the manners of converting pixels from being expressed in one of those color spaces to being expressed in another.

The {R,G,B} color space expresses the color of a given pixel using a red (R) value, a green (G) value, and a blue (B) value, each of which can range from 0-255. Moreover, a related color space is the {R,G,B,A} color space, which adds a fourth value, the alpha (A) value, which can also range from 0-255 and is a measure of the transparency (and equivalently then the opacity) at which the given pixel should be displayed. The {R,G,B} color space, then, does not express color in a way that requires a separate brightness value. Instead, the resulting color of the pixel is the result of some amount of red-color intensity, some amount of green-color intensity, and some amount of blue-color intensity, where one or more of those amounts could be zero.

The {L,a,b} color space expresses the color of a given pixel using one value (L) to represent luminance (i.e., brightness) and the other two values (a and b) to represent color. Typically, for a given pixel, 'L' can range between values of 0 and 100, while each of 'a' and 'b' can range between −128 and +128. Thus, the combination of the 'a' value and the 'b' value identify a particular color, and the 'L' value indicates the luminance level at which that particular color should be displayed. More particularly, the combination of the 'a' value and the 'b' value specify what is known as the chromaticity of the pixel, where chromaticity is an objective specification of the quality of a color independent of luminance, and where the combination of the chromaticity of a pixel and the luminance of the pixel specify the visible color of that pixel. For simplicity of explanation, this disclosure considers (i) the 'L' value of a given pixel in the {L,a,b} color space to represent the luminance level of that pixel and (ii) the {a,b} values of a given pixel in the {L,a,b} color space to represent the color of that pixel.

The {X,Y,Z} color space is known as a tristimulus color space, and is based on the fact that the human eye has three types of cone cells, which are the types of cells that are responsible for color vision in medium-brightness and high-brightness situations. Each type of cone cell is essentially a filter having its peak sensitivity at a different respective wavelength of light. The {X,Y,Z} color space is similar to the {L,a,b} color space in at least one respect: one of the three values (Y) is used to represent luminance and the other two values (X and Z) in combination are used to specify chromaticity (and therefore color, given a level of luminance). For simplicity of explanation, this disclosure considers (i) the 'Y' value of a given pixel in the {X,Y,Z} color space to represent the luminance level of that pixel and (ii) the {X,Z} values of a given pixel in the {X,Y,Z} color space to represent the color of that pixel.

Moreover, in general, as the term is used herein, the "color-distribution dimensionality" of a given set of image data, video data, pixels, and/or the like is an expression of how varied (or not varied) the color values are across the particular data set. Moreover, a given data set that is determined to have a color-distribution dimensionality that is "high-dimensional chromatic" as that term is used herein is one that has been determined to have a relatively widely varying collection of color values across that given data set (i.e., a relatively wide variety of different colors); conversely, a given data set that is determined to have a color-distribution dimensionality that is "low-dimensional chromatic" as that term is used herein is one that has been determined to have only a relatively narrowly varying collection of color values across that given data set (i.e., a relatively narrow concentration of only a relatively small number of different colors).

Figure 3:
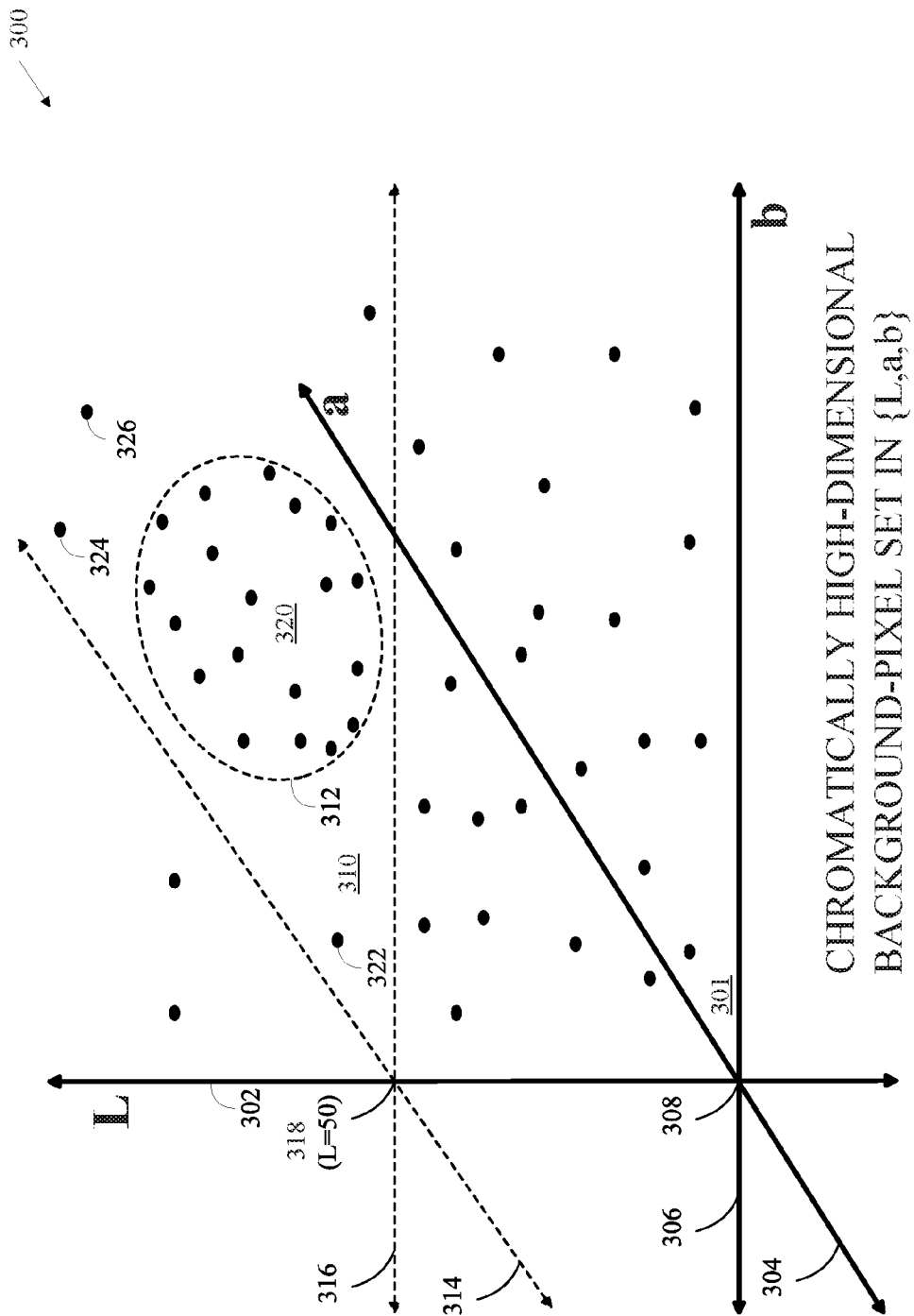
FIG. 3 depicts an example graphical representation of example chromatically high-dimensional background video data in the {L,a,b} color space, in accordance with some embodiments.

FIG. 3 depicts an example graphical representation of example chromatically high-dimensional background video data in the {L,a,b} color space, in accordance with some embodiments. In particular, FIG. 3 depicts a graph 300 having an 'L' axis 302, an 'a' axis 304, and a 'b' axis 306 that all intersect at an origin point 308 that corresponds to the point ({L,a,b}|{0,0,0}). As depicted in FIG. 3, the 'a' axis 304 and the 'b' axis 306 together define a plane 301 at which L=0. The graph 300 also includes a point 318 on the 'L' axis at which L=50 (i.e., the point ({L,a,b}|{50,0,0})). Passing through the point 318 are (i) a supplemental 'a' axis 314 that is parallel to the 'a' axis 304 and (ii) a supplemental 'b' axis 316 that is parallel to the 'b' axis 306. Together, the supplemental 'a' axis 314 and the supplemental 'b' axis 316 define a plane 310 that is parallel to the plane 301. On the plane 310, L=50.

The graph 300 also includes a scattering of pixels (solid black dots) that are collectively representative of the pixels in an example background video (e.g., a frame of background video) that is deemed in this disclosure to be high-dimensional chromatic. As can be seen in FIG. 3, the various pixels in the graph 300 are scattered widely with respect to the a-b plane. Moreover, the pixels that are numbered 320-326 are located in the plane 310; i.e., each of the pixels 320-326 has an 'L' value equal to 50. As is explained more fully below in connection with FIG. 4, the dashed circle 312 around the pixels 320 is an example graphical representation of the overall degree of variance of the pixels in the plane 310.

It is further noted that the number of pixels that is depicted in FIG. 3 and each of the other figures that graphically display pixels is by way of example only; in actual implementations, any number of pixels could be present in any one of the figures. Furthermore, as explained below, some of the figures have corresponding elements; for example, the circle 312 and the pixels 320 are shown in both FIG. 3 and FIG. 4; in such instances, these elements are meant to correspond to one another, but minor differences such as different numbers of pixels 320 being displayed in the circle 312 in FIG. 3 vs. FIG. 4 should not be interpreted as mistakes; these figures are meant to be explanatory and helpful in nature, and are used herein to illustrate various aspects of this disclosure. Moreover, the selection of L=50 as an illustrative and explanatory 'L' value is purely by way of example and not limitation, as any one or more other 'L' values could have used instead or in addition for purposes of illustration and exposition.

Figure 4:
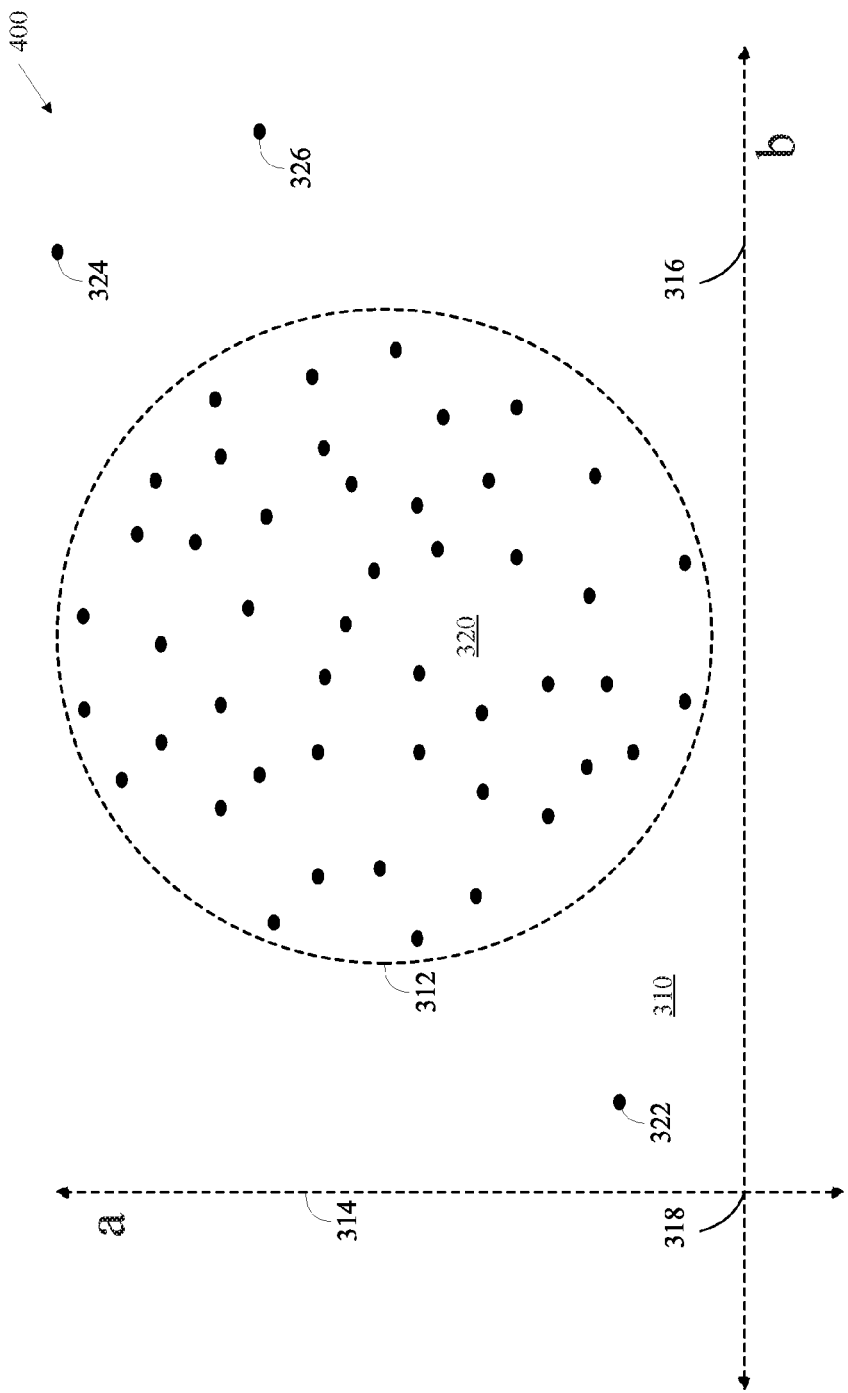
FIG. 4 depicts an example graphical representation of an example subset of the example chromatically high-dimensional background video data of FIG. 3, in accordance with some embodiments.

FIG. 4 depicts an example graphical representation of an example subset of the example chromatically high-dimensional background video data of FIG. 3, in accordance with some embodiments. Essentially, FIG. 4 depicts a graph 400 that is a subset of the graph 300 of FIG. 3 from a different perspective. The graph 400, then, depicts all of the points from the graph 300 for which L=50. The elements that are common to both graphs are the plane 310, the circle 312, the supplemental 'a' axis 314, the supplemental 'b' axis 316, the point 318, the pixels 320 inside the circle 312, and the outlier pixels 322-326. The circle 312 is meant to be a graphical illustration of the degree of variance in the a-b plane (i.e., the "{a,b} variance") of the pixels from the graph 300 at the luminance level L=50. If conceptualized as a minimum bounding circle (around all pixels or around all pixels except for a few outliers), then various different dimensions of the circle 312 could be used as proxies for the degree of {a,b} variance in the plane 310. Some such dimensions of the circle 312 that could be used as an {a,b}-variance proxy include circumference, area, radius, and diameter.

Figure 5:
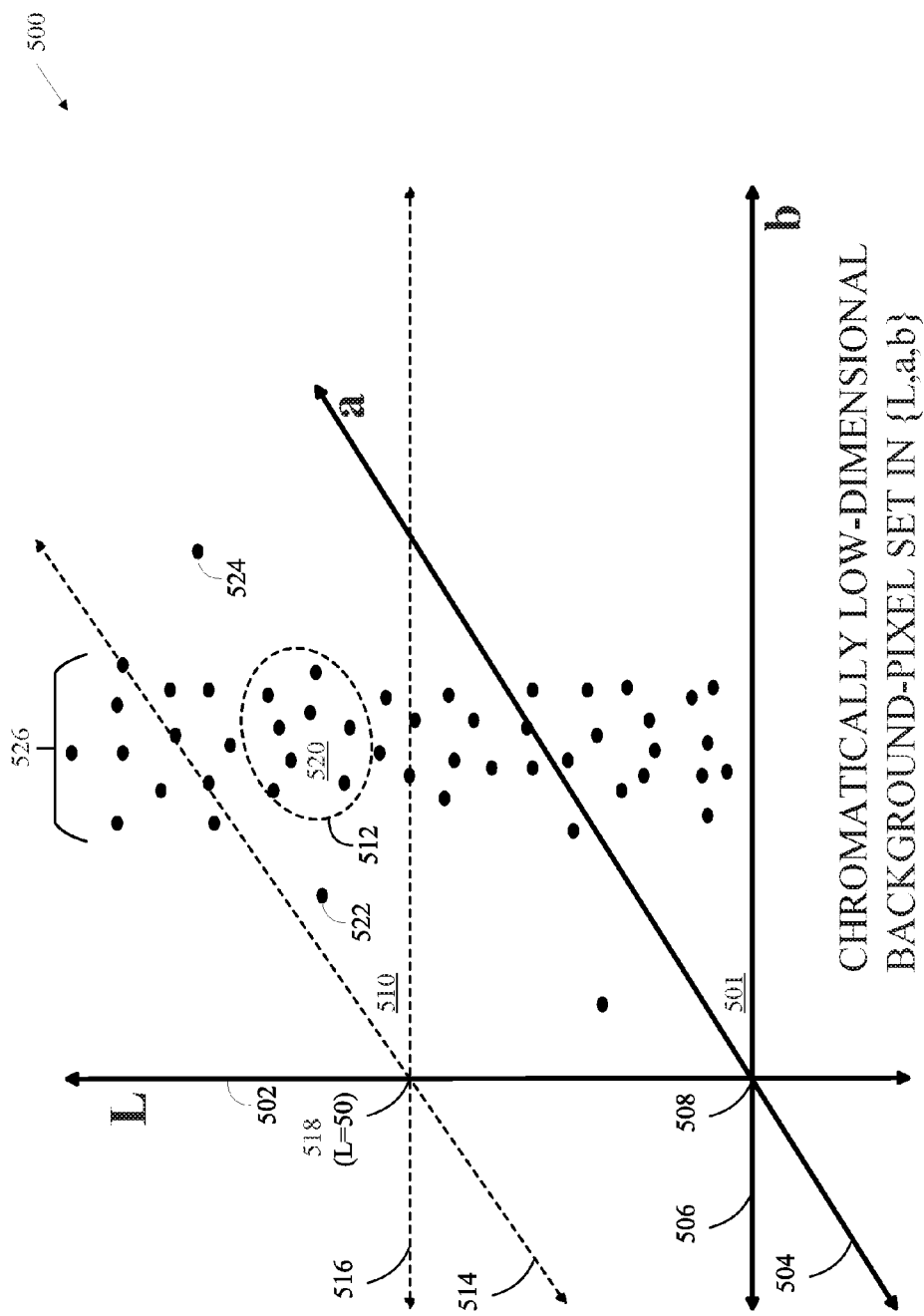
FIG. 5 depicts an example graphical representation of example chromatically low-dimensional background video data in the {L,a,b} color space, in accordance with some embodiments.

FIG. 5 depicts an example graphical representation of example chromatically low-dimensional background video data in the {L,a,b} color space, in accordance with some embodiments. In particular, FIG. 5 depicts a graph 500 that is somewhat similar to the graph 300 of FIG. 3 other than that the pixels in the graph 500 are meant to illustrate those of an example background video (e.g., a frame of background video) that is deemed in this disclosure to be low-dimensional chromatic (as opposed to high-dimensional chromatic in FIGS. 3-4). As depicted in FIG. 5, the graph 500 includes an 'L' axis 502, an 'a' axis 504, and a 'b' axis 506 that all intersect at an origin point 508 that corresponds to the point ({L,a,b}|{0,0,0}). As depicted in FIG. 5, the 'a' axis 504 and the 'b' axis 506 together define a plane 501 at which L=0. The graph 500 also includes a point 518 on the 'L' axis at which L=50 (i.e., the point ({L,a,b}|{50,0,0})). Passing through the point 518 are (i) a supplemental 'a' axis 514 that is parallel to the 'a' axis 504 and (ii) a supplemental 'b' axis 516 that is parallel to the 'b' axis 506. Together, the supplemental 'a' axis 514 and the supplemental 'b' axis 516 define a plane 510 that is parallel to the plane 501. On the plane 510, L=50.

As alluded to above, the graph 500 also includes a (generally narrower) scattering of pixels that are collectively representative of the pixels in an example background video (e.g., a frame of background video) that is deemed in this disclosure to be low-dimensional chromatic (unlike the high-dimensional chromatic nature that is depicted in FIGS. 3-4). As can be seen in FIG. 5, the various pixels in the graph 500 are not scattered particularly widely with respect to the a-b plane. Moreover, the pixels that are numbered 520-524 are located in the plane 510; i.e., each of the pixels 520-524 has an 'L' value equal to 50. As is explained more fully below in connection with FIG. 5, the dashed circle 512 around the pixels 520 is an example graphical representation of the overall degree of variance of the pixels in the plane 510.

Figure 6:
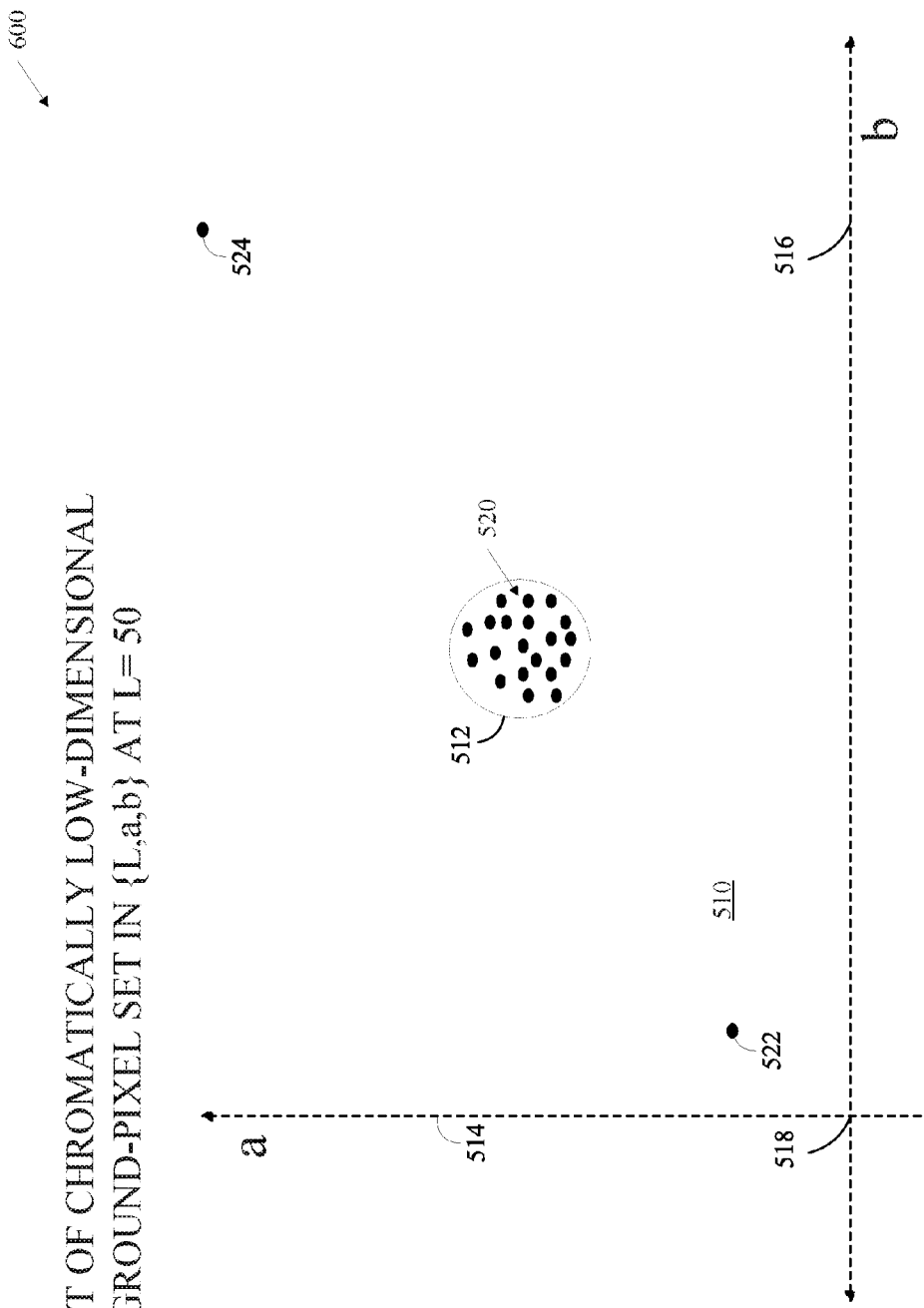
FIG. 6 depicts an example graphical representation of an example subset of the example chromatically low-dimensional background video data of FIG. 5, in accordance with some embodiments.

FIG. 6 depicts an example graphical representation of an example subset of the example chromatically low-dimensional background video data of FIG. 5, in accordance with some embodiments. On a general level, the graph 600 of FIG. 6 is to the graph 500 of FIG. 5 as the graph 400 of FIG. 4 is to the graph 300 of FIG. 3. Thus, essentially, FIG. 6 depicts a graph 600 that is a subset of the graph 500 of FIG. 5 from a different perspective. The graph 600, then, depicts all of the points from the graph 500 for which L=50. The elements that are common to both graphs are the plane 510, the circle 512, the supplemental 'a' axis 514, the supplemental 'b' axis 516, the point 518, the pixels 520 inside the circle 512, and the outlier pixels 522-524. The circle 512 is meant to be a graphical illustration of the "{a,b} variance" of the pixels from the graph 500 at the luminance level L=50. If conceptualized as a minimum bounding circle (around all pixels or around all pixels except for a few outliers), then, similar to the circle 312, various different dimensions (e.g., circumference, area, radius, diameter) of the circle 512 could be used as proxies for the degree of {a,b} variance in the plane 510.

At step 106, the computing device 200 determines the color-distribution dimensionality of the background video data to be either high-dimensional chromatic or low-dimensional chromatic. As described above, FIGS. 3-4 pertain to an example set of pixels that is considered high-dimensional chromatic in the terms of this disclosure, while FIGS. 5-6 pertain to an example set of pixels that is considered to be low-dimensional chromatic in the terms of this disclosure.

In at least one embodiment, the computing device 200 carries out step 106 at least in part by carrying out a series of sub-steps. First, the computing device 200 converts the obtained background video data, which in this example is a single frame of background-video data (though in other examples the background-video data could be from or based on multiple frames of background-video data), from the {R,G,B} color space to the {L,a,b} color space. Second, the computing device 200 calculates the {a,b} variance of the converted background pixels. Third, the computing device 200 compares the calculated {a,b} variance to an {a,b}-variance threshold. Fourth and last, the computing device 200 determines the color-distribution dimensionality of the background video data to be (i) high-dimensional chromatic if the calculated {a,b} variance exceeds the {a,b}-variance threshold or (ii) low-dimensional chromatic if the calculated {a,b} variance does not exceed the {a,b}-variance threshold. Various example ways in which these sub-steps could be carried out are described below.

The computing device 200 could calculate the {a,b} variance of the converted background pixels in a number of different ways. In general, as stated above, as used herein, the {a,b} variance of a set of pixels—in this case the converted background pixels—is essentially an expression of how spread out or concentrated the pixels in that set are with respect to the 'a' and 'b' dimensions.

In some embodiments, the computing device 200 determines an {a,b} variance at each of a plurality of different 'L' values (perhaps all 'L' values that are represented in the converted background pixels), and on a luminance-level-by-luminance-level basis decides whether the {a,b} variance at each such luminance level exceeds a single-luminance-level threshold or degree of {a,b} variance. The computing device 200 may then count up how many levels have an {a,b} variance that exceeds that single-luminance-level threshold, and then compare that count to a threshold number of levels. In such embodiments, the {a,b}-variance threshold would take the form of a certain threshold number of levels. That number could be zero or greater than zero in various different embodiments; that number could also be expressed as a fraction or percentage of the total number of luminance levels that are represented in the converted background pixels, the total number of possible luminance levels, or some other possibility.

In some embodiments, the computing device 200 similarly determines an {a,b} variance at each of a plurality of different 'L' values (perhaps all 'L' values that are represented in the converted background pixels), sums those luminance-level-specific {a,b}-variance values, and then compares that sum with an {a,b}-variance threshold, which in such embodiments would take the form of a threshold aggregate amount of {a,b} variance as opposed to a number of luminance levels as described in the previous example. And certainly numerous other manners of calculating an aggregate {a,b} variance of the converted background pixels and comparing the result of that calculation to one or more threshold values could be listed here. And in this context and in others, the use of the {L,a,b} color space is by way of example and not limitation. The {X,Y,Z} color space or any other suitable color space could be used.

With respect to the calculation of the {a,b} variance at any given luminance level, this could involve a rigorous mathematical calculation of variance (i.e., the expected value of the squared deviation from the mean in both the 'a' and 'b' axes), and could instead or in addition involve a more "rough" calculation or proxy for the {a,b} variance such as the area, circumference, radius, or diameter of a minimum-bounding circle with respect to the pixels (perhaps excluding one or more outliers) at that luminance level. And certainly the dimensions and/or area or the like of shapes other than a minimum-bounding circle could be used as well or instead.

In at least one embodiment, step 106 can be characterized as (i) determining the color-distribution dimensionality of the background video data to be low-dimensional chromatic if the background-color distribution of the background video data in the {L,a,b} color space can be expressed as:

$$\{(L,a,b)|a=f_a(L), b=f_b(L)\},$$

where $f_a$ and $f_b$ are functions and (ii) otherwise determining the color-distribution dimensionality of the background video data to be high-dimensional chromatic. This is essentially saying that, if knowing the 'L' value of a given pixel is sufficient to identify both the 'a' value and the 'b' value for that pixel (or at least approximate the 'a' and 'b' values closely enough because the pixels are relatively concentrated in the a-b plane for all or a sufficient number of 'L' values), then the background video data can be characterized as being low-dimensional chromatic; and if not, the background video data can be characterized as being high-dimensional chromatic.

Returning to FIG. 1, at step 108, the computing device 200 selects a chromatic-adjustment technique from a set of chromatic-adjustment techniques based on the determined color-distribution dimensionality of the background video data. At step 110, the computing device 200 adjusts the foreground video data using the selected chromatic-adjustment technique. The following paragraphs describe a number of different ways that the computing device 200 may carry out steps 108 and 110.

In at least one embodiment, the set of chromatic-adjustment techniques includes what is referred to herein as a white-balancing technique. In at least one embodiment, the computing device 200 selects the white-balancing technique when the color-distribution dimensionality of the background video data is determined to be high-dimensional chromatic. In at least one embodiment, the set of chromatic-adjustment techniques includes what is referred to herein as a chromatic-replacement technique. In at least one embodiment, the computing device 200 selects the chromatic-replacement technique when the color-distribution dimensionality of the background video data is determined to be low-dimensional chromatic.

This and the next few paragraphs provide an example as to how the computing device 200 could carry out the white-balancing technique in cases where that is the selected chromatic-adjustment technique. In at least one embodiment, the computing device 200 adjusts the foreground video data using the white-balancing technique at least in part by carrying out a number of sub-steps. First, the computing device 200 determines an average of the pixels of the foreground video data and an average of the pixels in the background video data. In an embodiment, the computing device 200 determines both the foreground average pixel and the background average pixel in the {R,G,B} color space. Next, the computing device 200 converts both the foreground average pixel and the background average pixel from the {R,G,B} color space to a second color space, which could be {L,a,b}, {X,Y,Z}, or some other color space. {L,a,b} is used by way of example in this part of the disclosure.

Next, the computing device 200 determines a transform matrix in {L,a,b} from the converted foreground average pixel to the converted background average pixel. In an embodiment, this transform matrix includes three separate dimension-wise ratios: the ratio of the background-average-pixel 'L' value to the foreground-average-pixel 'L' value, the ratio of the background-average-pixel 'a' value to the foreground-average-pixel 'a' value, and the ratio of the background-average-pixel 'b' value to the foreground-average-pixel 'b' value. And certainly other forms of transform matrices could be used.

The computing device 200 also converts all or substantially all of the pixels of the obtained foreground video data to the second color space, which again is {L,a,b} in this example, and transforms the converted foreground pixels in the second color space using the determined transform matrix. In the case of the transform matrix including the three ratios described in the preceding paragraph, the computing device 200 would transform the converted foreground pixels at least in part by, for each foreground pixel, multiplying the foreground pixel's 'L' value by the average-background-L-to-average-foreground-L ratio, (ii) multiplying the foreground pixel's 'a' value by the average-background-a-to-average-foreground-a ratio, and (iii) multiplying the foreground pixel's 'b' value by the average-background-b-to-average-foreground-b ratio. The computing device 200 may then convert the now-transformed foreground pixels back to the {R,G,B} color space.

This and the next few paragraphs provide an example as to how the computing device 200 could carry out the chromatic-replacement technique in cases where that is the selected chromatic-adjustment technique. In at least one embodiment, the computing device 200 carries out the step of converting all or substantially all of the pixels of the obtained background video data from the {R,G,B} color space to the {L,a,b} color space. It is noted, however, that this conversion step is not necessarily part of carrying out the chromatic-replacement technique, since the computing device 200 may have already converted the background pixels from {R,G,B} to {L,a,b} in order to make the determination as to whether the color-distribution dimensionality of the background video data is high-dimensional chromatic or low-dimensional chromatic. If, however, the computing device 200 had not previously converted the background pixels to {L,a,b}, the computing device 200 may do so as part of—or as a necessary precursor to—carrying out the chromatic-replacement technique. In any event, the chromatic-replacement technique is described below in a manner that presumes that the background pixels have already been converted to {L,a,b}.

Figure 7:
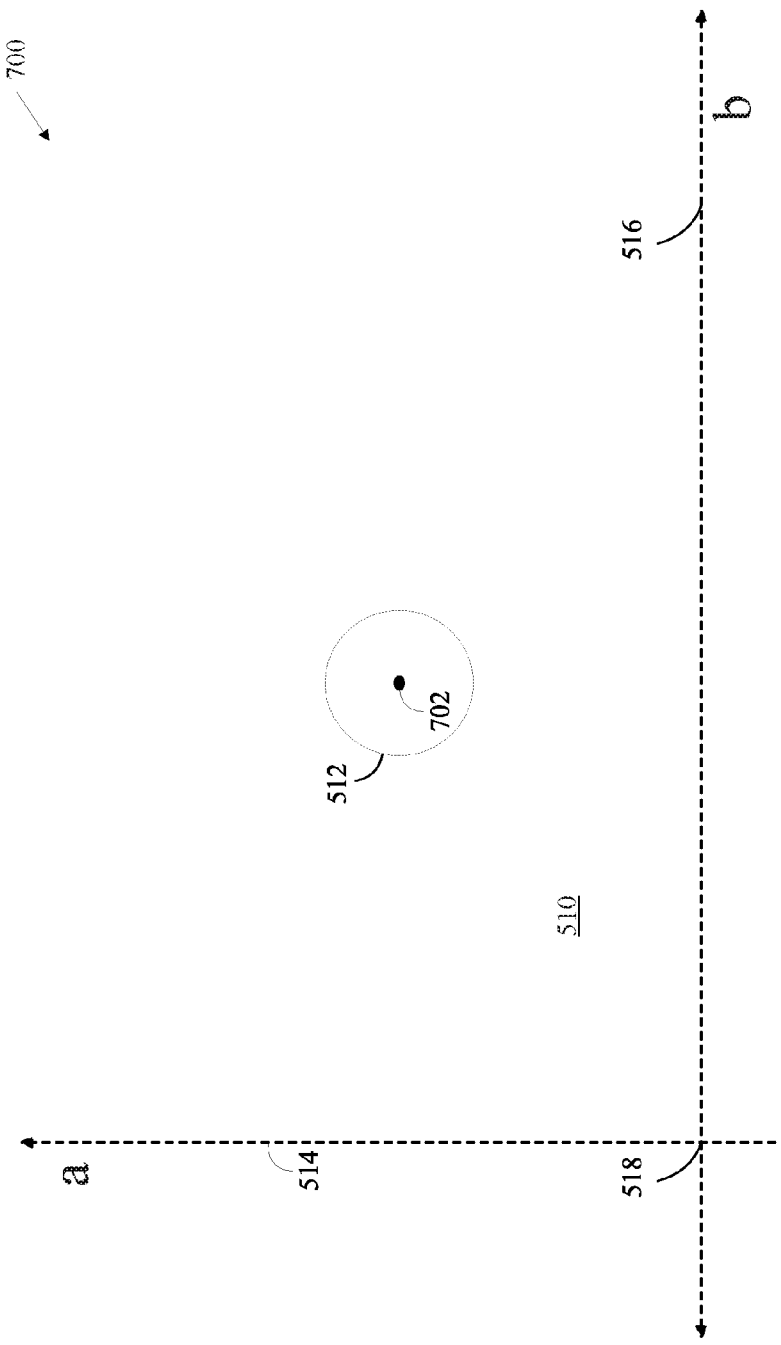
FIG. 7 depicts an example idealization of the example subset of FIG. 6, in accordance with some embodiments.

As to carrying out the chromatic-replacement technique, the computing device 200 may do so at least in part by carrying out a number of sub-steps. One such sub-step involves generating an L-to-{a,b} lookup table based on the converted background pixels. An example way of doing this is now described in connection with FIGS. 5-9. As described above, FIG. 5 shows an example low-dimensional-chromatic set of pixels. In the balance of this disclosure, FIGS. 5-7 are considered to represent the set of background pixels after having been converted to {L,a,b} as described above. The specific example described herein is with respect to an 'L' value of 50, which as described above is selected purely by way of example.

In FIG. 5 and FIG. 6, as described above, the {a,b} variance of the pixels 520-524 in the L=50 plane 510 is represented by the size of the bounding circle 512 that surrounds the background pixels 520 in the plane 510. It is noted that this {a,b} variance could be calculated using such a circle or in any other suitable way as described above, and that the size of the circle 512 is a representation of the extent of the {a,b} variance that is present at L=50 in the background pixel set of FIG. 5. As part of generating an L-to-{a,b} lookup table based on the converted background pixels, the computing device 200 may determine a characteristic {a,b} value for L=50 in the background pixel set. One way to phrase the determination of a characteristic {a,b} value for L=50 (or any other particular 'L' value) in the background pixel set is idealizing or generating an idealization of the background pixels for which L=50.

FIG. 7 depicts an example idealization of the example subset of FIG. 6, in accordance with some embodiments. The graph 700 of FIG. 7 includes a number of elements of the graph 600 of FIG. 6. Among the salient differences are that the outlier points 522-524 have been removed, and the pixels 520 inside the bounding circle 512 have been reduced to a single characteristic pixel 702 having a particular 'a' value and a particular 'b' value. In this disclosure, the characteristic 'a' value at L=50 is referred to as $a_{50}$ and the characteristic 'b' value at L=50 is referred to as $b_{50}$. Thus, the characteristic (L=50) pixel 702 can be expressed as $\{a_{50}, b_{50}\}$. It is noted that the characteristic pixel 702 could be determined by averaging the {a,b} values of a plurality of pixels (such as the pixels 520 or perhaps the pixels 520-524, as examples). Another way of determining the characteristic pixel 702 could be to randomly select any one of the pixels 520 to represent the group. And certainly other approaches could be used.

Figure 8:
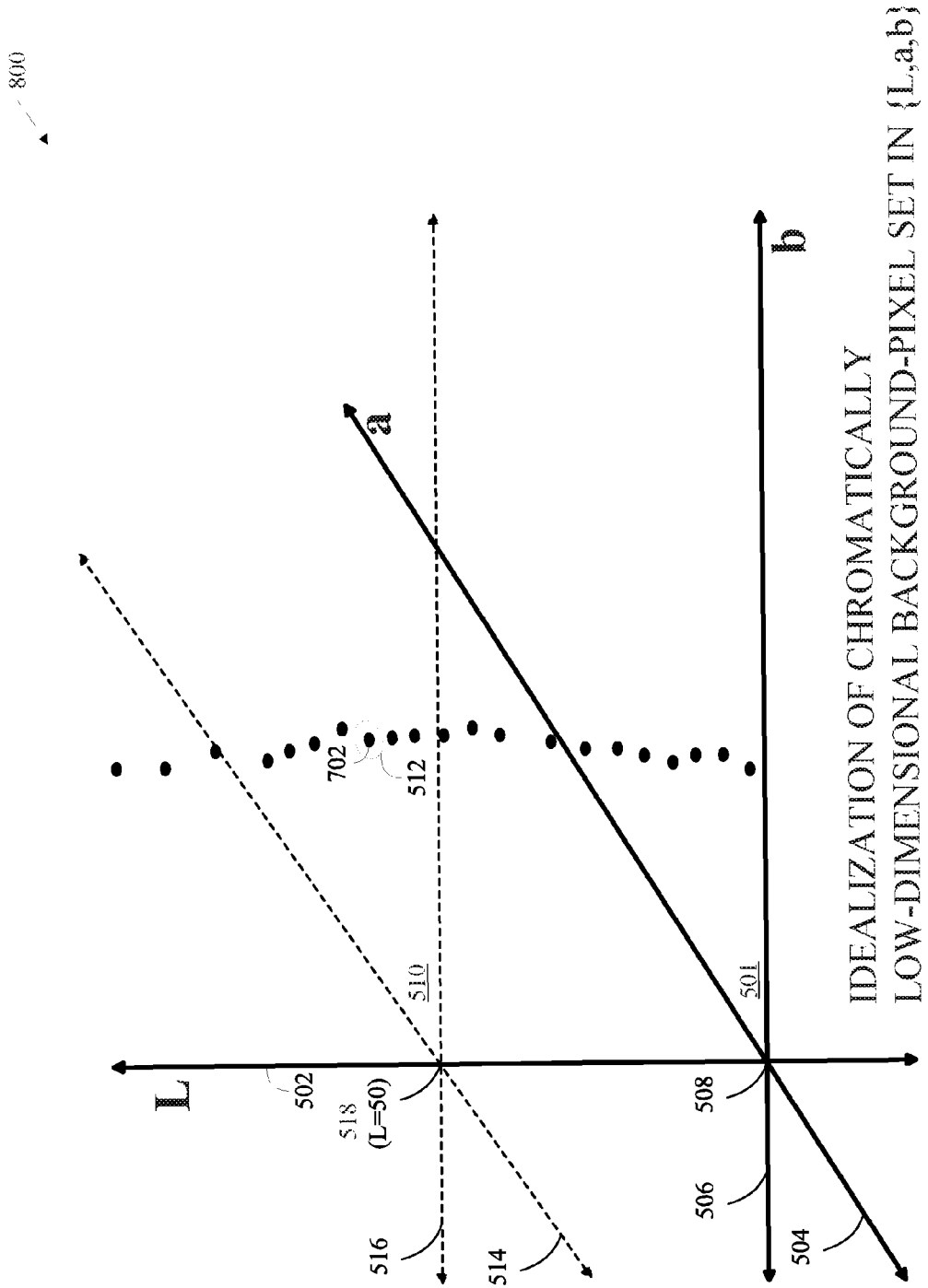
FIG. 8 depicts an example idealization of the example chromatically low-dimensional background video data of FIG. 5 that incorporates the example idealization of FIG. 7, in accordance with some embodiments.

FIG. 8 depicts an example idealization of the example chromatically low-dimensional background video data of FIG. 5 that incorporates the example idealization of FIG. 7, in accordance with some embodiments. In particular, FIG. 8 depicts a graph 800 that is quite similar in a number of ways to the graph 500 of FIG. 5. But instead of showing all of the background pixels 520-524, the graph 800 shows only the characteristic pixel that has been determined for each of a plurality of 'L' values that are present in the converted background pixels. This of course includes the characteristic pixel 702 that, as described above, corresponds to L=50. As can be seen by comparison of FIGS. 5 and 8, the column 526 of pixels in the graph 500 (which encompasses all but the outliers) has been idealized into a string (or single-pixel-wide column) of pixels by way of the idealization process described above. This information can then be populated into an L-to-{a,b} lookup table.

FIG. 9 depicts an example L-to-{a,b} look-up table that corresponds to the example idealization of FIG. 8, in accordance with some embodiments. In particular, FIG. 9 depicts an example L-to-{a,b} look-up table 900 that includes columns for each of the possible values of L (0, 1, 2 ... 100) and shows some example rows at L=0, L=1, L=2, L=49, L=50, L=51, L=99, and L=100. Consistent with the above description, the row at L=50 corresponds to the above-described characteristic point 702 that is an idealization in the a-b plane of the background pixel set at L=50. In each of the rows, the $a_L$ and $b_L$ notation is used for each L in the table 900, and also some example values for the various characteristic 'a' values and characteristic 'b' values are included as well.

It should be noted that, while it is certainly possible that a given pixel set would have every possible value of 'L' represented, it is also certainly possible that there could be a number of actual implementation examples in which there are one or more empty 'L' rows (i.e., values of 'L' for which no pixels (or perhaps too few pixels) exist in the pixel set and thus for which no characteristic 'a' values and characteristic 'b' values could be determined). In some embodiments, an extrapolation process is used to fill in the entire table in case characteristic {a,b} values are needed for missing 'L' values. In other embodiments, extrapolation takes place on an as-needed basis for missing 'L' values. Such extrapolation could involve simply copying the {a,b} data from a nearest 'L' entry, or perhaps averaging the {a,b} values from some number of proximate 'L' entries that have valid {a,b) data, etc. And certainly other example approaches could be listed as well.

In at least one embodiment, as an additional sub-step in carrying out the chromatic-replacement technique, the computing device 200 converts all or substantially all of the pixels of the foreground video data from the {R,G,B} color space to the {L,a,b} color space. The computing device 200 may do this before or after the generation of the L-to-{a,b} look-up table 900, which may or may not have been done in the above-described manner.

In at least one embodiment, as a further sub-step in carrying out the chromatic-replacement technique, the computing system 200 transforms the converted foreground pixels at least in part by (a) using the respective L values of the respective converted foreground pixels to select respective replacement {a,b} values for the respective converted foreground pixels based on the L-to-{a,b} lookup table 900 and (b) replacing the respective {a,b} values of the respective converted foreground pixels with the corresponding respective selected replacement {a,b} values. In at least one embodiment, as an additional sub-step in carrying out the chromatic-replacement technique, the computing device 200 converts the transformed foreground pixels from {L,a,b} back to {R,G,B}. An example of carrying out these last two sub-steps is described below in connection with FIGS. 10-17.

FIG. 10 depicts an example table representation of example foreground video data in the {R,G,B} color space, in accordance with some embodiments. In particular, FIG. 10 depicts a foreground-{R,G,B} table 1000 having four columns: a foreground-pixel index number, an 'R' value, a 'G' value, and a 'B' value. The foreground-{R,G,B} table 1000 is also depicted as having a row for each of 307,200 different foreground pixels, corresponding as an example to the total number of pixels in a 640×480 image. Some example 'R,' 'G,' and 'B' values are shown in the foreground-{R,G,B} table 1000. For reasons that will become clearer upon reading the description of the ensuing figures, the reader's attention is called to row 1002 (foreground-pixel FG-2), row 1004 (FG-156000), and row 1006 (FG-307199). Pixel FG-2 has {R,G,B} values of {181,95,66}, corresponding to a light brown. Pixel FG-156000 has {R,G, B} values of {230,24,102}, corresponding to a pinkish red.

And pixel FG-307199 has {R,G,B} values of {153,110,70}, corresponding to more of a milk-chocolate brown.

FIG. 11 depicts an example table representation of the example foreground video data of FIG. 10 after having been converted to the {L,a,b} color space, in accordance with some embodiments. In particular, FIG. 11 depicts a foreground-{L,a,b} table 1100 showing the same foreground pixels but after having been converted to {L,a,b}. The table 1100 is quite similar to the table 1000, other than that the pixels are of course expressed in the table 1100 in the {L,a,b} color space instead of in the {R,G,B} color space as is the case with table 1000. The reader will note that the same three pixels (FG-2, FG-156000, and FG-307199) that were referenced above are also called out at rows 1102, 1104, and 1106, respectively. The reader will further note that, while those three foreground pixels have three different pairs of {a,b} values, all three of those pixels have their respective 'L' value equal to 50.

Figure 12:
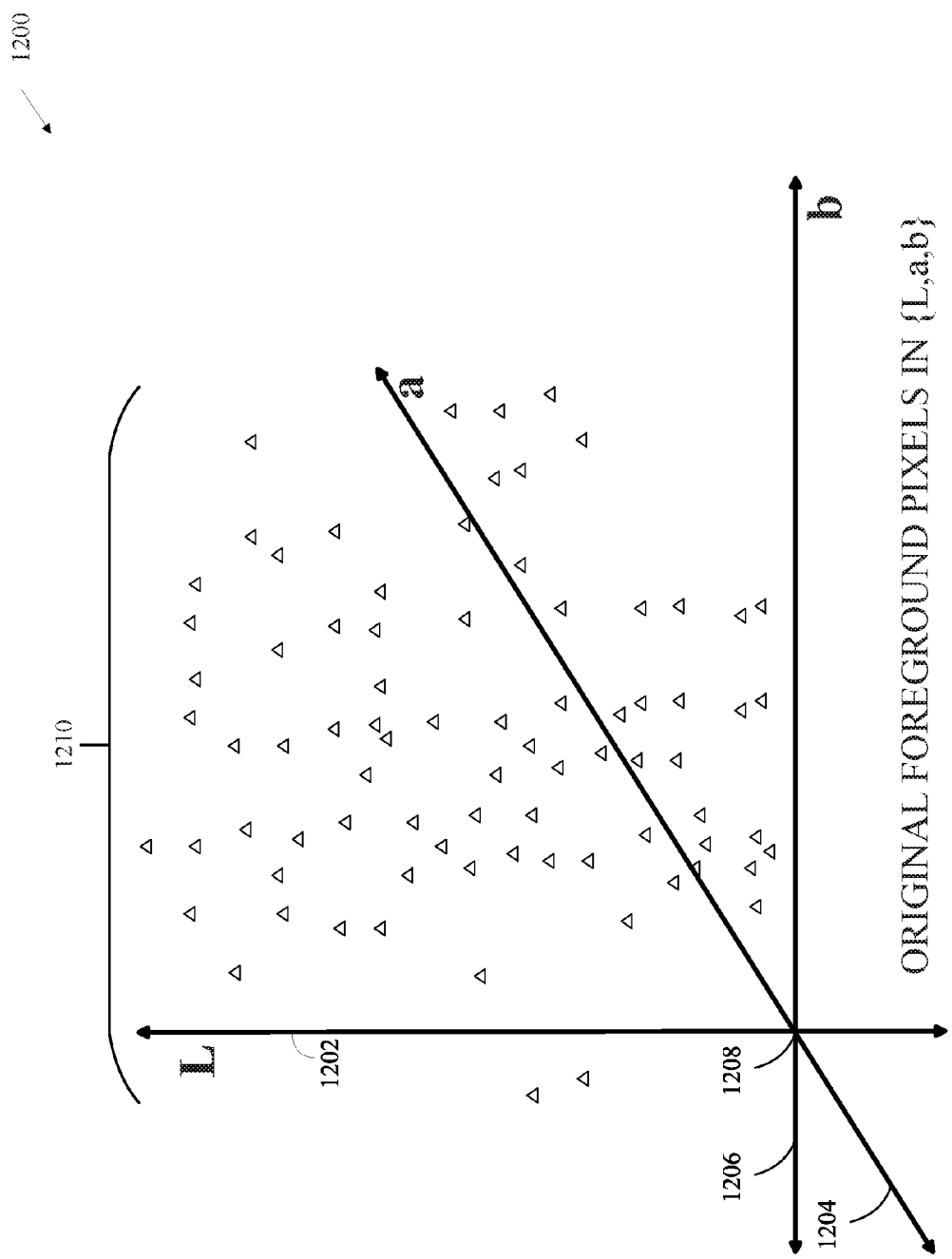
FIG. 12 depicts an example graphical representation of the example converted foreground video data of FIG. 11 in the {L,a,b} color space, in accordance with some embodiments.

FIG. 12 depicts an example graphical representation of the example converted foreground video data of FIG. 11 in the {L,a,b} color space, in accordance with some embodiments. In particular, FIG. 12 depicts a graph 1200 that shows a relatively scattered set of foreground pixels, which are meant to correspond to the pixels of FIGS. 10 and 11 (although of course expressed in the {L,a,b} color space in FIG. 12 as they are in FIG. 11). The graph 1200 includes an 'L' axis 1202, an 'a' axis 1204, and a 'b' axis 1206 that all intersect at an origin point 1208 that corresponds to the point ({L,a,b}|{0,0,0}). Each foreground pixel is represented in the graph 1200 by an empty triangle. Moreover, the relatively high breadth (i.e., variance) of the foreground pixels collectively is shown using a brace 1210.

Figure 13:
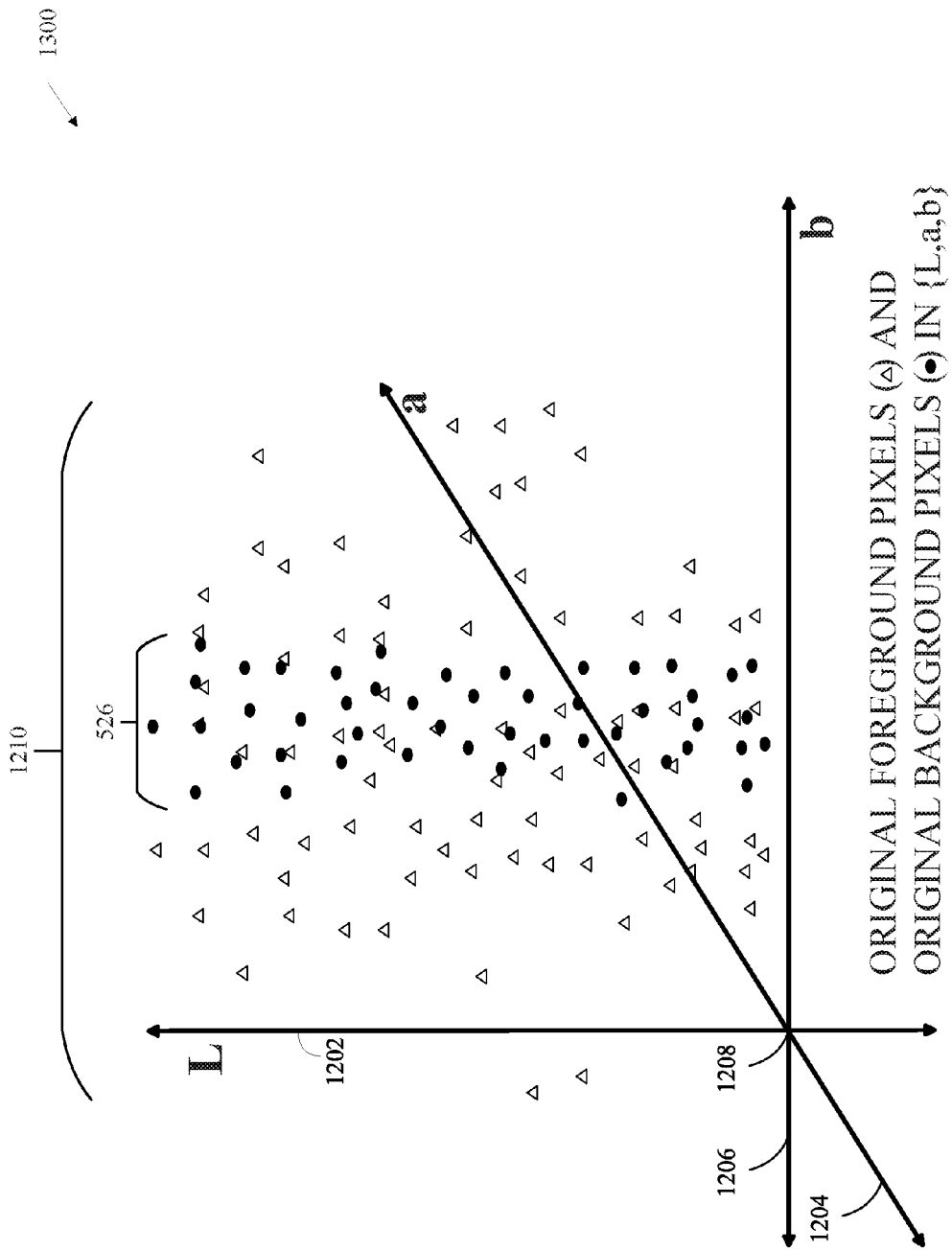
FIG. 13 depicts an example graphical representation that shows both the example chromatically low-dimensional background video data of FIG. 5 and the example converted foreground video data of FIG. 12, both in the {L,a,b} color space, in accordance with some embodiments.

FIG. 13 depicts an example graphical representation that shows both the example chromatically low-dimensional background video data of FIG. 5 and the example converted foreground video data of FIG. 12, both in the {L,a,b} color space, in accordance with some embodiments. In particular, FIG. 13 depicts a graph 1300 that is essentially the graphs 500 and 1200 overlaid on one another, albeit without the outlier pixels 522-524 from the graph 500. As can be seen by simple inspection of the graph 1300 of FIG. 13, it is clear that the degree of variety and scattering of the foreground pixels (as represented graphically by the brace 1200) significantly exceeds that of the background pixels (as represented graphically by the much narrower brace 526).

To wit, the graph 1300 is a depiction of the fact that, in this example, the foreground pixels as a group have significantly higher color-distribution dimensionality than do the background pixels as a group. Because the {L,a,b} color space (as does the {X,Y,Z} color space) is defined such that luminance is in a single dimension and color (or chromaticity) is in the other two dimensions, this color space provides a useful visualization tool of the color variance of a given set of pixels at various different luminance levels and also the relative color variance of two different sets of pixels.

As described above, the computing system 200 transforms the converted foreground pixels at least in part by (a) using the respective L values of the respective converted foreground pixels to select respective replacement {a,b} values for the respective converted foreground pixels based on the L-to-{a,b} lookup table 900 and (b) replacing the respective {a,b} values of the respective converted foreground pixels with the corresponding respective selected replacement {a,b} values. An example result of this sub-step of the chromatic-replacement technique is shown in FIG. 14.

FIG. 14 depicts an example table representation of the example converted foreground video data of FIGS. 11-12 after having been transformed in the {L,a,b} color space using a chromatic-replacement technique, in accordance with some embodiments. In particular, FIG. 14 depicts an example transformed-foreground-{L,a,b} table 1400 that is quite similar in layout to the foreground-{L,a,b} table 1100 of FIG. 11. What is different about the content, however, is that the actual foreground-pixel {a,b} values that are present in the foreground-{L,a,b} table 1100 of FIG. 11 have been replaced in the transformed-foreground-{L,a,b} table 1400 with {a,b} values selected by the computing device 200 from the L-to-{a,b} lookup table 900 based on the respective 'L' values of those foreground pixels.

As described above, in at least one embodiment, in cases where the respective 'L' values of the foreground pixels are present in the L-to-{a,b} lookup table 900, the computing device 200 simply replaces the corresponding {a,b} values in the table 1100 with the {a,b} values from that 'L' entry in the L-to-{a,b} lookup table 900; and in cases where the respective 'L' values of the foreground pixels are not present in the L-to-{a,b} lookup table 900, the computing device 200 replaces the corresponding {a,b} values in the table 1100 with {a,b} values derived by interpolation, perhaps in one of the manners described above, from one or more 'L' entries that are present in the L-to-{a,b} lookup table 900.

With respect to the foreground pixels FG-2, FG-156000, and FG-307199, it can be seen in the transformed-foreground-{L,a,b} table 1400 that, while those three pixels still have L=50, each of them now has a=48 and b=32, which are the $a_{50}$ and $b_{50}$ values, respectively, from the L-to-{a,b} lookup table 900. Based on the discussion above, it will be evident to one of skill in the art that, while those three pixels previously had three different colors, they have now been transformed to all having the same color due to having the same brightness value.

Figure 15:
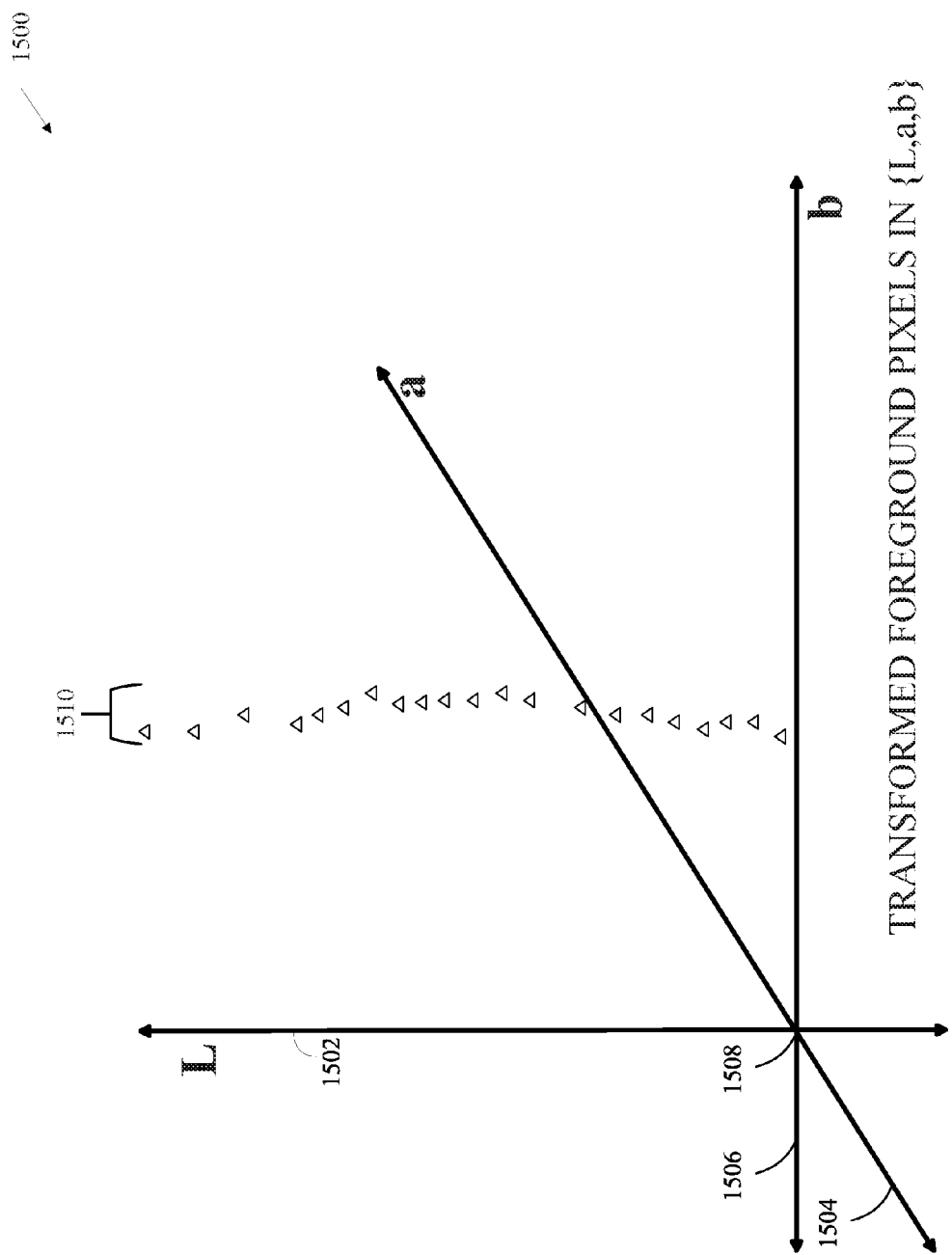
FIG. 15 depicts an example graphical representation of the transformed foreground video data of FIG. 14 in the {L,a,b} color space, in accordance with some embodiments.

FIG. 15 depicts an example graphical representation of the transformed foreground video data of FIG. 14 in the {L,a,b} color space, in accordance with some embodiments. In particular, FIG. 15 depicts a graph 1500 that plots the transformed foreground pixels that are listed in tabular form in the transformed-foreground-{L,a,b} table 1400 of FIG. 14. The graph 1500 includes an 'L' axis 1502, an 'a' axis 1504, and a 'b' axis 1506 that all intersect at an origin point 1508 that corresponds to the point ({L,a,b}|{0,0,0}). The plot of foreground pixels in the graph 1500 appears quite similar to the idealization of the background pixels that is shown in the graph 800 of FIG. 8. Certainly there could be multiple pixels in any of the plotted locations in the graph 1500, and in that way the graph 1500 could be viewed as a plot of only the unique pixels in the transformed foreground pixels of FIG. 14. The narrow color-distribution dimensionality of the transformed foreground pixels is shown visually by the relatively narrow brace 1510.

Figure 16:
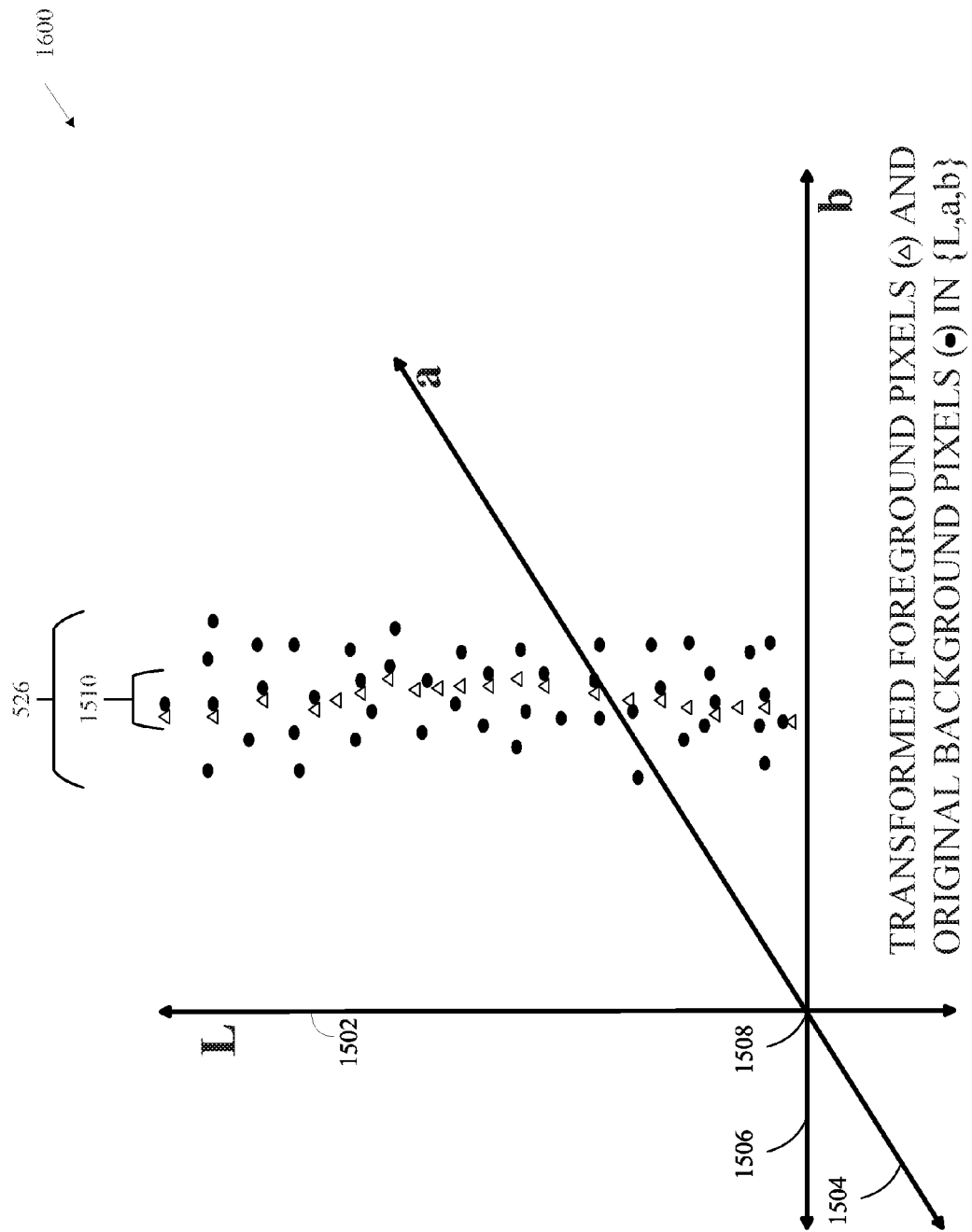
FIG. 16 depicts an example graphical representation that shows both the example chromatically low-dimensional background video data of FIG. 5 and the example transformed foreground video data of FIG. 15, both in the {L,a,b} color space, in accordance with some embodiments.

FIG. 16 depicts an example graphical representation that shows both the example chromatically low-dimensional background video data of FIG. 5 and the example transformed foreground video data of FIG. 15, both in the {L,a,b} color space, in accordance with some embodiments. The graph 1600 of FIG. 16 is quite similar to the graph 1500 of FIG. 15, other than that the pixel column and corresponding brace 526 from FIG. 5 have been added. It is apparent from inspection of the graph 1600 that the color-distribution dimensionality of the transformed foreground pixels (as shown be the narrower brace 1510) is less than that of the original background pixels (minus the outliers) (as shown by the wider brace 526). Compared to the pre-foreground-transformation situation that is depicted in the graph 1300 of FIG. 13, the post-foreground-transformation situation that is depicted in the graph 1600 of FIG. 16 illustrates that the transformed foreground pixels are now well within the color range of the original background pixels.

Figure 17:
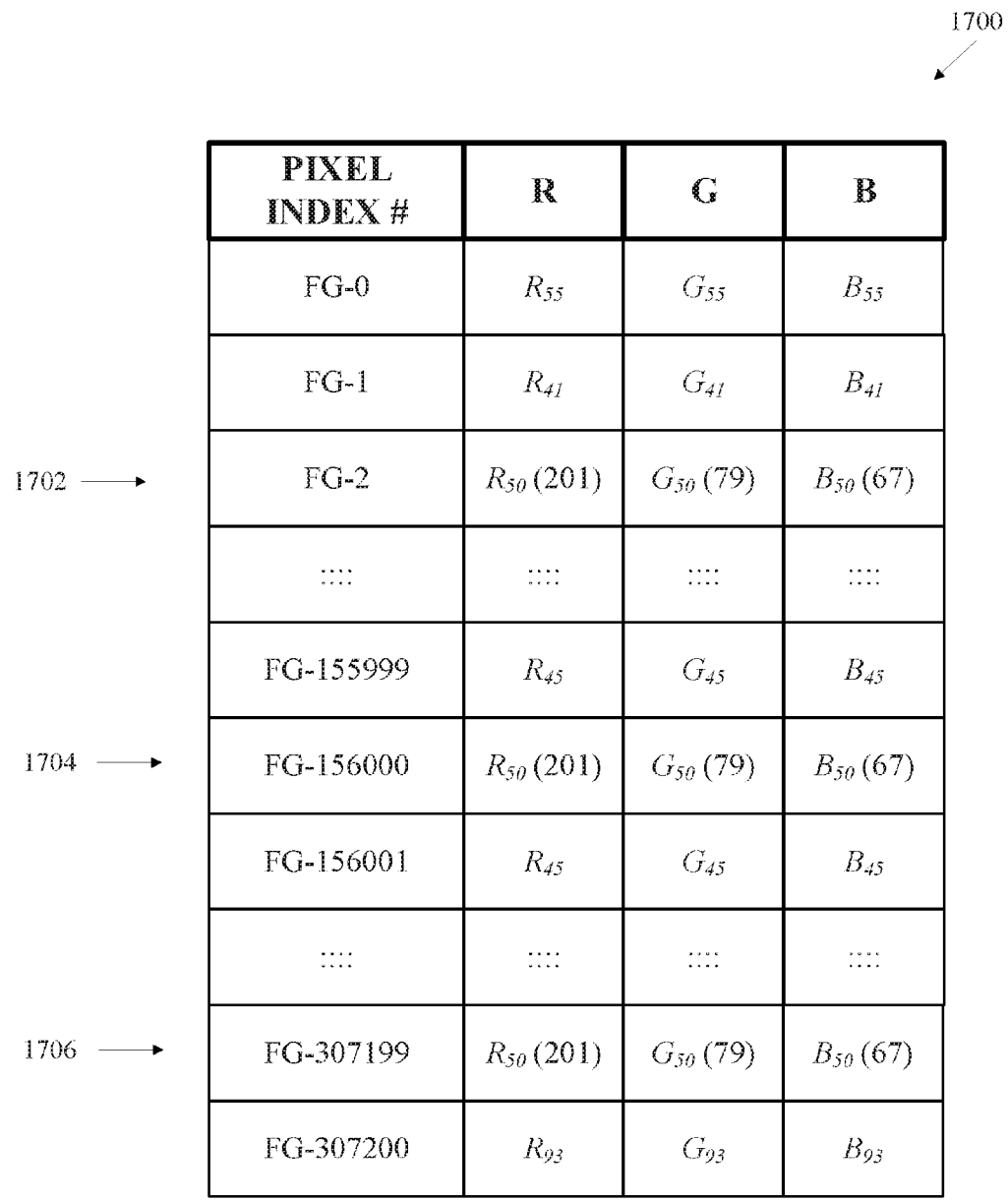
FIG. 17 depicts an example table representation of the example transformed foreground video data of FIGS. 14-15 after having been converted to the {R,G,B} color space, in accordance with some embodiments.

FIG. 17 depicts an example table representation of the example transformed foreground video data of FIGS. 14-15 after having been converted to the {R,G,B} color space, in accordance with some embodiments. As can be seen in FIG. 17, the table 1700 has the same content as the table 1400 of FIG. 14, albeit with the {L,a,b} expressions of the foreground pixels from the table 1400 having been replaced by the {R,G,B} expressions of the foreground pixels in the table 1700. Consistent with the above description of the transformation of like-luminance foreground pixels to having the same color as one another, it can be seen that the rows 1702, 1704, and 1706 show respectively that the pixels FG-2, FG-156000, and FG-307199 each now have the {R,G,B} values of {201,79,67}, which corresponds to a dark orange.

Thus, the previous variety of light brown, pinkish red, and milk-chocolate brown among those three example pixels has been replaced by three dark-orange pixels. This would correspond to an example where the original background pixels were largely concentrated in the orange/red/brown area of the visible-light spectrum. And a foreground video that would have previously clashed with that background video (due at least to the pinkish red) has been transformed to a foreground video that appealingly sits within the relatively concentrated color range of the original background video.

Returning to FIG. 1, at step 112, the computing device 200 generates combined video data at least in part by combining the background video data with the adjusted foreground video data. This step may be performed in several different ways. In at least one embodiment, the computing device 200 combines the adjusted foreground video data with the background video data using what is known is an alpha mask, which is essentially a mapping of all of the pixel locations that will be in the combined video, where in that mapping, a '1' value indicates that the corresponding pixel location should be filled with the corresponding pixel from the foreground video and a '0' value indicates that the corresponding pixel location should be filled with the corresponding pixel from the background video. And certainly other techniques could be used, as known to those having skill in the art.

In at least one embodiment, generating the combined video at least in part by combining the adjusted foreground video data with the background video data includes performing a smoothing operation to a boundary between the adjusted foreground video data and the background video data. In an embodiment, the smoothing operation includes a Poisson image-blending technique. And certainly other examples could be listed.

In at least one embodiment, the method 100 also includes (i) obtaining second foreground video data and (ii) adjusting the second foreground video data using the selected chromatic-adjustment technique, and generating the combined video data includes combining the background video data with both the adjusted foreground video data and the adjusted second foreground video data. And clearly this is extendible to any number of foreground videos (e.g., personas of respective participants in a given collaborative online communication session) being obtained, chromatically adjusted based on the background video, and combined with the background video.

At step 114, the computing device 200 outputs the combined video data for display. This step may be performed in several different ways. In at least one embodiment, the computing device 200 outputs the combined video data for display via the display 220 and/or one or more other displays. In at least one embodiment, the computing device 200 outputs the combined video data via a network connection for display on one or more other devices. And certainly other examples could be listed.

Moreover, it is noted that, although the above examples and embodiments are described in the context of adjusting one or more foreground videos based on the color-distribution dimensionality of a single background video, this is not required of all embodiments. Indeed, in some embodiments, the designations of "foreground" and "background" could be reversed or not present at all (i.e., it could simply be the adjustment of a first video based on a color-distribution dimensionality of a second video). Moreover, it also need not be the case that one or more videos are chromatically adjusted based on another video and then combined with that other video; in some cases, one or more videos that are to be combined could each be chromatically adjusted based on a common reference point (e.g., a given white point, grey point, or the like). Indeed, in some embodiments, a "mood" or "style" or other setting could be available to chromatically adjust one or more videos (one or more "foreground" videos, a "background" video, and/or one or more other videos) prior to combination using chromatic profiles such as sepia, high brightness, pastels, earth tones, and/or one or more others deemed suitable by those in the art for a given implementation.

What is claimed is:

1. A method comprising:
   obtaining foreground video data;
   obtaining background video data;
   determining a color-distribution dimensionality of the background video data to be either high-dimensional chromatic or low-dimensional chromatic;
   selecting a chromatic-adjustment technique from a set of chromatic-adjustment techniques based on the determined color-distribution dimensionality of the background video data;
   adjusting the foreground video data using the selected chromatic-adjustment technique;
   generating combined video data at least in part by combining the background video data with the adjusted foreground video data; and
   outputting the combined video data for display.

2. The method of claim 1, wherein determining the color-distribution dimensionality of the background video data to be either high-dimensional chromatic or low-dimensional chromatic comprises:
   converting pixels of the background video data from an {R,G,B} color space to an {L,a,b} color space;
   calculating an {a,b} variance of the converted background pixels;
   comparing the calculated {a,b} variance to an {a,b}-variance threshold;
   determining the color-distribution dimensionality of the background video data to be high-dimensional chromatic if the calculated {a,b} variance exceeds the {a,b}-variance threshold; and
   determining the color-distribution dimensionality of the background video data to be low-dimensional chromatic if the calculated {a,b} variance does not exceed the {a,b}-variance threshold.

3. The method of claim 2, wherein:
   calculating the {a,b} variance of the converted background pixels comprises determining how many luminance levels in the converted background pixels have more than a luminance-level-specific degree of {a,b} variance; and the {a,b}-variance threshold is a threshold number of luminance levels.

4. The method of claim 3, wherein the threshold number of luminance levels is zero.

5. The method of claim 3, wherein the threshold number of luminance levels is greater than zero.

6. The method of claim 2, wherein calculating the {a,b} variance of the converted background pixels comprises:

determining a respective luminance-level-specific {a,b} variance for each of a plurality of luminance levels that are represented in the converted background pixels; and calculating the {a,b} variance of the converted background pixels to be a sum of the determined luminance-level-specific {a,b} variances.

7. The method of claim 2, wherein calculating the {a,b} variance of the converted background pixels comprises:

determining a respective luminance-level-specific {a,b} variance for each luminance level represented in the converted background pixels; and calculating the {a,b} variance of the converted background pixels to be a sum of the determined luminance-level-specific {a,b} variances.

8. The method of claim 1, wherein determining the color-distribution dimensionality of the background video data to be either high-dimensional chromatic or low-dimensional chromatic comprises:

determining the color-distribution dimensionality of the background video data to be low-dimensional chromatic if a background-color distribution of the background video data in an {L,a,b} color space is supported by a relationship defined by:

$$\{(L,a,b)|a=f_a(L),b=f_b(L)\},$$

where $f_a$ and $f_b$ are functions; and otherwise determining the color-distribution dimensionality of the background video data to be high-dimensional chromatic.

9. The method of claim 1, wherein:

the set of chromatic-adjustment techniques includes a white-balancing technique and a chromatic-replacement technique; and selecting a chromatic-adjustment technique based on the determined color-distribution dimensionality comprises:

selecting the white-balancing technique when the color-distribution dimensionality of the background video data is determined to be high-dimensional chromatic; and selecting the chromatic-replacement technique when the color-distribution dimensionality of the background video data is determined to be low-dimensional chromatic.

10. The method of claim 9, wherein adjusting the foreground video data using the white-balancing technique comprises:

determining a foreground average of pixels of the foreground video data in an {R,G,B} color space;

determining a background average of pixels of the background video data in the {R,G,B} color space;

converting the foreground average and the background average from the {R,G,B} color space to a second color space;

determining a transform matrix in the second color space from the converted foreground average to the converted background average;

converting the pixels of the foreground video data from the {R,G,B} color space to the second color space;

transforming the converted foreground pixels in the second color space using the determined transform matrix; and converting the transformed foreground pixels from the second color space to the {R,G,B} color space.

11. The method of claim 10, wherein the determined transform matrix comprises dimension-wise ratios in the second color space of the converted background average to the converted foreground average.

12. The method of claim 10, wherein the second color space is an {L,a,b} color space.

13. The method of claim 10, wherein the second color space is an {X,Y,Z} color space.

14. The method of claim 13, wherein converting the foreground pixels from the {R,G,B} color space to the second color space comprises converting the foreground pixels from the {R,G,B} color space to an {L,a,b} color space and then from the {L,a,b} color space to the {X,Y,Z} color space.

15. The method of claim 9, further comprising converting pixels of the background video data from an {R,G,B} color space to an {L,a,b} color space, wherein adjusting the foreground video data using the chromatic-replacement technique comprises:

generating an L-to-{a,b} lookup table based on the converted background pixels;

converting pixels of the foreground video data from the {R,G,B} color space to the {L,a,b} color space;

transforming the converted foreground pixels at least in part by:

using the respective L values of the respective converted foreground pixels to select respective replacement {a,b} values for the respective converted foreground pixels based on the L-to-{a,b} lookup table; and replacing the respective {a,b} values of the respective converted foreground pixels with the corresponding respective selected replacement {a,b} values; and converting the transformed foreground pixels from the {L,a,b} color space to the {R,G,B} color space.

16. The method of claim 15, wherein using the respective L values of the respective converted foreground pixels to select the respective replacement {a,b} values for the respective converted foreground pixels based on the L-to-{a,b} lookup table comprises:

retrieving the respective replacement {a,b} values from the L-to-{a,b} lookup table in cases where the respective L value of the respective converted foreground pixel is listed in the L-to-{a,b} lookup table.

17. The method of claim 16, wherein using the respective L values of the respective converted foreground pixels to select the respective replacement {a,b} values for the respective converted foreground pixels based on the L-to-{a,b} lookup table further comprises:

using interpolated {a,b} values based on one or more entries in the L-to-{a,b} lookup table as the respective replacement {a,b} values in cases where the respective L value of the respective converted foreground pixel is not listed in the L-to-{a,b} lookup table.

18. The method of claim 17, wherein the interpolated {a,b} values are copied from a nearest L value that is listed in the L-to-{a,b} lookup table.

19. The method of claim 17, wherein the interpolated {a,b} values are average {a,b} values of two or more proximate entries in the L-to-{a,b} lookup table.

20. The method of claim 1, further comprising:
obtaining second foreground video data; and
adjusting the second foreground video data using the selected chromatic-adjustment technique,
wherein generating the combined video data comprises combining the background video data with both the adjusted foreground video data and the adjusted second foreground video data.

21. A system comprising:
a communication interface;
a processor; and
a non-transitory computer-readable medium storing instructions executable by the processor for causing the system to perform functions including:
obtaining foreground video data;
obtaining background video data;
determining a color-distribution dimensionality of the background video data to be either high-dimensional chromatic or low-dimensional chromatic;
selecting a chromatic-adjustment technique from a set of chromatic-adjustment techniques based on the determined color-distribution dimensionality of the background video data;
adjusting the foreground video data using the selected chromatic-adjustment technique;
generating combined video data at least in part by combining the background video data with the adjusted foreground video data; and
outputting the combined video data for display.

\* \* \* \* \*